United States Patent [19]
Cooper et al.

[11] Patent Number: 6,079,000
[45] Date of Patent: Jun. 20, 2000

[54] XPC BACKUP FOR IN-PROCESS AUDIT

[75] Inventors: Thomas P. Cooper, New Brighton; Michael J. Hill, Vadnais Heights; Dennis R. Konrad, Welch; Thomas L. Nowatzki, Shoreview, all of Minn.

[73] Assignee: Unisys Corporation, Blue Bell, Pa.

[21] Appl. No.: 09/001,136

[22] Filed: Dec. 30, 1997

[51] Int. Cl.⁷ .................................................. G06F 12/00
[52] U.S. Cl. ........................................... 711/162; 707/204
[58] Field of Search .............................. 711/162; 707/204

[56] References Cited

U.S. PATENT DOCUMENTS

| | | | |
|---|---|---|---|
| 4,314,331 | 2/1982 | Porter et al. | 364/200 |
| 4,394,733 | 7/1983 | Swenson | 364/200 |
| 4,603,380 | 7/1986 | Easton et al. | 364/200 |
| 4,897,781 | 1/1990 | Chang et al. | 364/200 |
| 4,967,242 | 10/1990 | Brenner et al. | 364/200 |
| 5,043,885 | 8/1991 | Robinson | 364/200 |
| 5,163,131 | 11/1992 | Row et al. | 395/200 |
| 5,193,162 | 3/1993 | Bordsen et al. | 395/425 |
| 5,263,145 | 11/1993 | Brady et al. | 395/425 |
| 5,305,389 | 4/1994 | Palmer | 382/1 |
| 5,309,451 | 5/1994 | Noya et al. | 371/40.4 |
| 5,325,509 | 6/1994 | Lautzenheiser | 395/425 |
| 5,353,425 | 10/1994 | Malamy et al. | 395/425 |
| 5,390,318 | 2/1995 | Ramakrishnan et al. | 395/425 |
| 5,758,150 | 5/1998 | Bell et al. | 395/610 |
| 5,764,879 | 6/1998 | Skarpelos et al. | 395/182.05 |

OTHER PUBLICATIONS

Cohen, King and Grady, Storage Hierarchies, pp. 62–76, IBM Systems Journal vol. 28, No. 1, 1989.
Nelson, Welchand Ousterhout, Caching in the Sprite Network File System, pp. 134–154, ACM Transactions on Computer Systems, vol. 6, No. 1, Feb. 1988.
Howard, John H. et al., Scale and Performance in a Distributed File System, pp. 51–81, ACM Transactions on Computer Systems, vol. 6, No. 1, Feb. 1988.

*Primary Examiner*—Jack A. Lane
*Attorney, Agent, or Firm*—Charles A. Johnson; Mark T. Starr; Nawrocki, Rooney and Sivertson, P.A.

[57] ABSTRACT

Method and apparatus for providing backup memory storage for audit trail data within a computer system having a main memory storage, a non-volatile memory storage, and backup memory storage. The computer system executes a number of transaction programs which generate audit trail entries. As the audit trail entries are generated, a portion of the audit trail entries are stored in a portion of the main memory storage to create an audit trail. The audit trail entries are accumulated in the portion of the main memory storage until a request is received to write the portion of the main memory storage to a corresponding portion of the non-volatile memory. Subsequent portions of the audit trail entries are accumulated in subsequent portions of the main memory storage. An output transfer to the backup memory storage is made once a sufficient number of portions of the main memory storage have been written to corresponding portions of the non-volatile memory in order to maximize the transfer efficiency to the backup memory storage.

60 Claims, 15 Drawing Sheets

6,079,000

XPC BACKUP FOR IN-PROCESS AUDIT

CROSS REFERENCE TO CO-PENDING APPLICATIONS

The present application is related to U.S. patent application Ser. No. 08/397,429, filed Mar. 1, 1995 entitled "Method for Making a Database Available to a User Program During Database Recovery", now U.S. Pat. No. 5,734,817, U.S. patent application Ser. No. 08/174,750, filed Dec. 23, 1993, entitled "Outboard File Cache System", now U.S. Pat. No. 5,809,527, and U.S. patent application Ser. No. 08/745,111, filed Nov. 7, 1996, entitled "Extended Processing Complex for File Caching", now U.S. Pat. No. 5,809,543, which is a continuation of Ser. No. 08/173,459, filed Dec. 23, 1993, entitled "Extended Processing Complex for File Caching", all assigned to the assignee of the present invention and both incorporated herein by reference.

BACKGROUND OF THE INVENTION

1. Field of the Invention

The present invention generally relates to digital data processing systems, and more particularly, to such systems that provide backup memory storage for database transactions.

2. Description of the Prior Art

A key feature of high reliability computer systems is recovery of the state of a database after a failure is detected within the computer system. Database failures may have any number of causes including hardware or software faults.

Data processing systems may be used to process sensitive transactions. One such transaction may be a withdrawal from a bank account. The transaction may be initiated by the user, for example, signing on to a work station or an ATM machine. The transaction must often be processed in real time by one or more data processing systems. To enhance the reliability of such systems, a transaction audit trail is often created to provide a backup of the transaction in the event the data processing system experiences a fault or failure. Often times transaction processing environments include an audit trail storage capability, or "physical audit trail" to record information such as database changes and message processing activity in real time. Many kinds of data may be stored in an audit trail, including information that reflects changes made to the database, or the status of the transaction processing environment. Each transaction may provide one or more sets of audit trail data to the physical audit trail. Often, the physical audit trail is a magnetic tape or disc drive storage device. As transaction processing programs continue to process transactions, audit trail data from each of the transactions may be accumulated in the physical audit trail.

Writing audit trail data for each transaction directly to the physical audit trail may not be efficient due to the time required to write each transaction and because of an inefficient use of the storage media. Each transfer to the physical audit trail requires the steps of both accessing and writing to the physical audit trail. The time required to access and write the audit trail data to the physical audit trail is often longer than the time required to process a transaction. Thus, in these types of systems, the processor may wait for a transaction to be written to the physical audit trail before processing the next transaction. Since the rate at which audit data is transferred to the physical audit trail is proportional to the number of transactions being processed, this approach may not be desirable in applications requiring high-volume transaction processing. In addition, if the physical audit trail is a magnetic tape or disc drive storage device, the data storage format may result in excessive portions of unused recording media between each stored transaction.

In an attempt to overcome these problems, the transfer to the physical audit trail may be delayed. The audit data is accumulated in a temporary storage location so that audit data from many transactions can be grouped into a single audit block. The single audit block is written to the physical audit trail in one transfer rather than the many transfers that would otherwise have been required for each individual transaction record.

This approach, while an improvement in many respects, still is not optimal. Many times transactions reach a "commit" state in which the transaction cannot be further processed without the backup audit trail data being secured. Thus, if the transaction is updating files within a data base, it is often necessary to wait for the audit trail data to be stored before continuing processing the same or another transaction. With this approach, transactions reaching the commit state often must wait for the audit trail data to be accumulated before the transfer to the physical audit trail is completed, thus reducing the rate that the transactions can be processed.

Accumulating audit data has still another limitation. As the audit trail data accumulates, prior to transfer to the physical audit trail, the probability that a hardware or software failure may occur within the data processing system increases. The hardware or software failure may cause a loss of audit trail data not yet transferred to the physical audit trail, thus increasing the risk of non-recovery from the data processing system failure.

SUMMARY OF THE INVENTION

The present invention overcomes many of the problems associated with the prior art by providing a method and apparatus for providing backup memory storage for database transactions within a computer system having a main memory storage, a non-volatile memory storage, and a backup memory storage. The data processing system executes one or more transaction programs which generate a number of database transactions. As the database transactions are generated, the audit trail data is stored in the main memory storage to create an audit trail. The audit trail data is accumulated in the main memory storage until a request is received to write the audit trail data from the main memory storage to the non-volatile memory. An output transfer to the backup memory storage is made once a sufficient quantity of audit trail data is accumulated in the non-volatile memory. This maximizes the transfer efficiency to the backup memory storage.

In a preferred embodiment, the data processing system executes on-line transactions and stores the audit trail data generated into a portion of the main memory storage to create an audit trail. The portion of the main memory storage is an audit host memory. Audit data is accumulated in the audit host memory while the transaction program processes the transactions.

An executive program resident on the data processing system records the status of the data base transactions in the audit host memory. The status may include an "active," state, a "commit in progress" state, and an "end of step" state. If the data base transaction in the audit host memory has a "commit in progress" state, a synchronous audit data request is made to write the current contents of the audit host memory to the non-volatile memory storage, as the transaction has reached a point wherein the transaction program may not be able to further execute the transaction without creating a backup for the audit trail. If the data base transaction in the audit host memory has a "end of step" state, a synchronous audit data request is made to write the current contents of the audit host memory to the non-volatile memory storage, as the transaction has been completed.

Upon receipt of the synchronous audit data request, the executive program writes the current contents of the audit host memory to the non-volatile memory storage area. In the preferred embodiment, the non-volatile memory storage area is an outboard file cache within the extended processing complex of a data processing system. The non-volatile memory may also be any memory contained within a unique power domain so that any interruption to the audit host memory will not affect the memory within the unique power domain.

As the number of transaction programs continue to generate a number of database transactions, more audit data is stored into the audit host memory. Each time a data base transaction in the audit host memory indicates a "commit in progress" state, a synchronous audit data request is made to write the portion of the audit host memory to a corresponding portion within the non-volatile memory. Each time the portion of the audit host memory is written to the corresponding portion of the non-volatile memory, a determination is made whether sufficient audit data has been accumulated within the audit host memory to warrant an optimal transfer to the backup memory storage. In the preferred embodiment, the backup memory storage is the physical audit trail and may be either a magnetic tape or disc storage device. Once a sufficient amount of audit trail data is accumulated to warrant an optimal transfer to the physical audit trail, the contents of the audit host memory are transferred to the physical audit trail. In the preferred embodiment, while the transfer is in progress from the audit host memory to the physical audit trail, newly arriving audit data may be accumulated in another portion of the main memory (e.g. another audit host memory) and another portion of the non-volatile memory.

In an alternative embodiment of the present invention, the physical audit trail may be resident on a portion of a main memory storage termed a mass storage audit trail file. Preferably, the mass storage audit trail file resides in a main memory that has a backup power supply, or is otherwise protected from a power failure. As the number of transaction programs continue to generate audit trail data, the audit trail data may be stored in the audit host memory. Like before, each time a data base transaction in the audit host memory indicates a "commit in progress" state, a synchronous audit data request is made to write the portion of the audit host memory to a corresponding portion within the non-volatile memory. Each time the portion of the audit host memory is written to the corresponding portion of the non-volatile memory, a determination is made whether sufficient audit trail data has been accumulated within the audit host memory to warrant an optimal transfer to the mass storage audit trail file. Once a sufficient number of audit data requests have been accumulated, the contents of the audit host memory are transferred to the mass storage audit trail file. Once the contents of the audit host memory have been transferred to the mass storage audit trail file, the non-volatile memory may be refreshed for reuse. Preferably, the non-volatile memory storage area is an outboard file cache within the extended processing complex of the data processing system.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
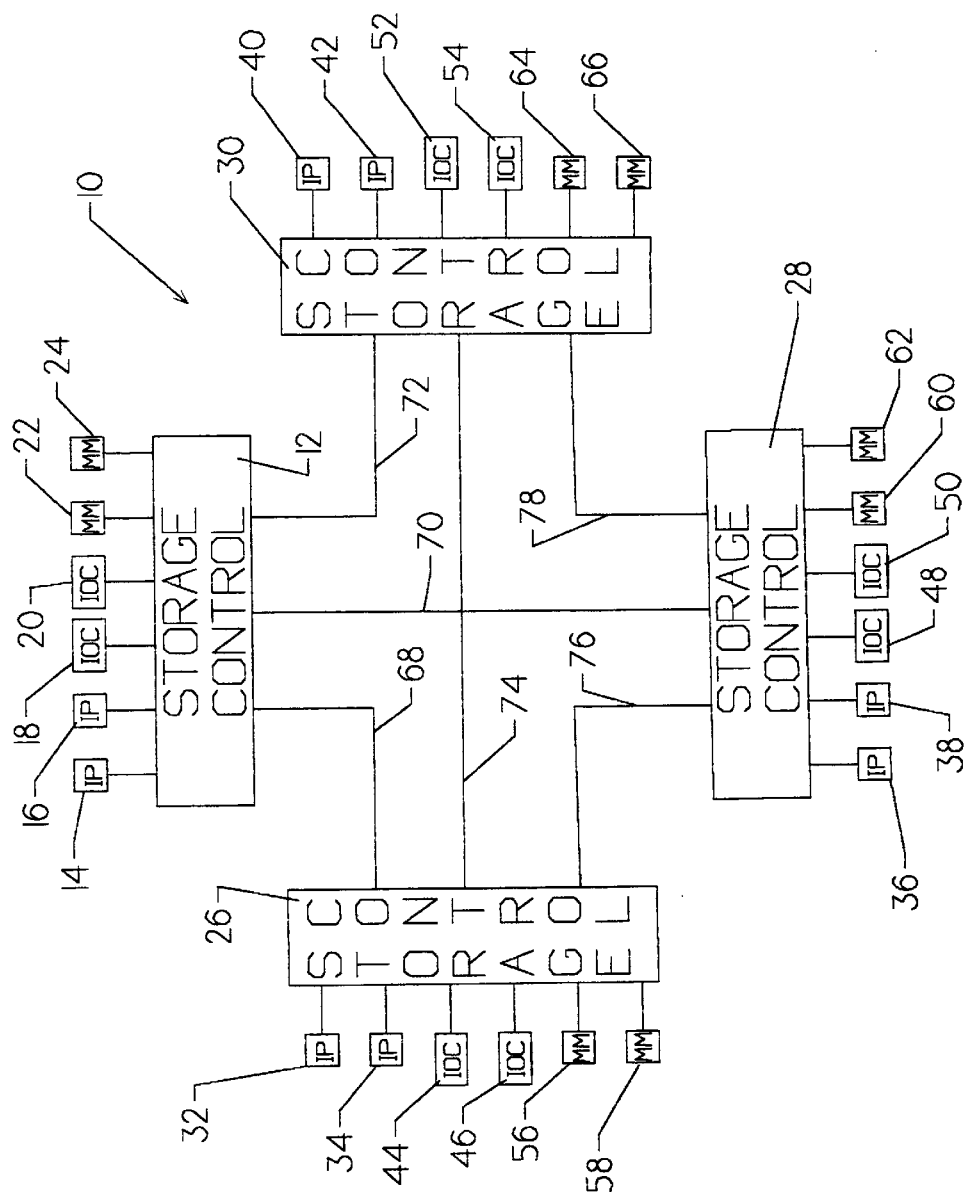
FIG. 1 is a block diagram of the preferred host data processing system in which the present invention is implemented.

FIG. 1 is a schematic diagram of the preferred data processing system 10 in which the present invention may be utilized. It is recognized that the present invention may be utilized in any computer system which provides backup memory storage for database transactions where the computer system has a main memory storage, a non-volatile memory storage, and a backup memory storage.

In the exemplary embodiment, data processing system 10 may include four independent operating environments each having their own storage controller and point-to-point communications with other independent operating environments via storage controller to storage controller interfaces. It is understood that other embodiments may include any number of independent operating environments, including eight or more, each having their own storage controller and point-to-point communications with the other independent operating environments via storage controller to storage controller interfaces, and be within the scope of the present invention. Each independent operating environment is referred to as a partition. A partition has its own operating system software which manages the allocation of resources within the partition. Because a partition has its own operating system, it may be referred to as a data processing system. Thus data processing system 10 may be partitioned into four data processing systems: a first data processing system having the resources accompanying storage controller 12, a second data processing system having the resources accompanying storage controller 26, a third data processing system having the resources accompanying storage controller 28, and a fourth data processing system having the resources accompanying storage controller 30.

Each data processing system or partition may further be contained within a unique power domain. For example, the power source for the first data processing system would be independent from the power source for the second data processing system, the third data processing system, and the fourth data processing system. A loss of power within one power domain would not affect the power source within any other power domain.

Storage controller 12 is coupled to storage controller 26 via interface 68. Similarly, storage controller 12 is coupled to storage controller 28 via interface 70 and to storage controller 30 via interface 72. Storage controller 26 communicates with storage controller 28 via interface 76 and to storage controller 30 via interface 74. In similar fashion, storage controller 28 and storage controller 30 are coupled via interface 78.

Storage controller 12 is fully populated with instruction processor 14, instruction processor 16, input/output complex 18, input/output complex 20, main memory module 22 and main memory module 24. Each of instruction processors 14 and 16 (along with similar instruction processors 32, 34, 36, 38, 40, and 42) has internal dedicated cache resources in the form of an instruction cache and an operand cache.

Input/output complexes 18 and 20, along with main memory modules 22 and 24, may be elements currently available, such as found in the Unisys Model 2200/600 series. Input/output complexes 44, 46, 48, 50, 52, and 54 and main memory modules 56, 58, 60, 62, 64, and 66 may be similarly found. Each of the input/output complexes 18, 20, 44, 46, 48, 50, 52, and 54 may contain multiple input/output processors (see also, FIG. 4). The input/output processors read data from main memory modules 22, 24, 56, 58, 60, 62, 64, and 66 to write to the peripheral devices, and read data from the peripheral devices to write to the main memory modules. Peripheral devices may include printers, tape drives, disk drives, network communication processors etc.

Storage controllers 12, 26, 28, and 30 may each control a separate database. For example, storage controller 12 may store a first database in memory modules 22 and 24. Similarly, storage controller 26 may store a second database in memory modules 56 and 58, storage controller 28 may store a third database in memory modules 60 and 62, and storage controller 30 may store a fourth database in memory modules 64 and 66. Any instruction processor may access any database. For example, instruction processors 14 and 16 may access any of the databases stored in memory modules 22, 24, 56, 58, 60, 62, 64, and 66, via interfaces 68, 70, 72, 74, 76, and 78.

Figure 2:
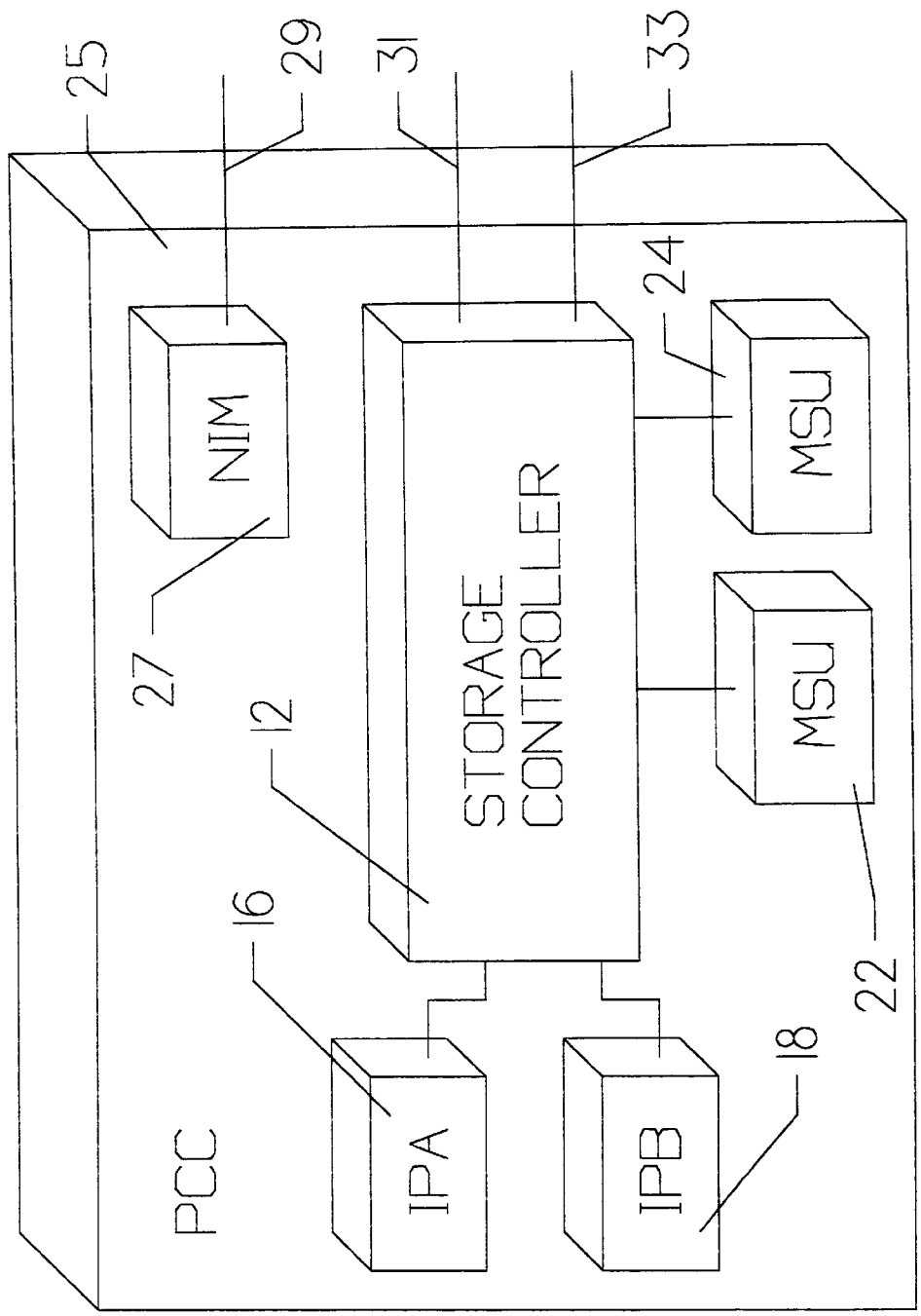
FIG. 2 is a pictorial diagram showing the packaging arrangement of the host processing system of FIG. 1.

FIG. 2 is a schematic diagram showing the packaging of a portion of data processing system 10. A major physical element of data processing system 10 is Processing Complex Cabinet (PCC) 25. Within fully populated PCC 25 is located instruction processors 16 and 18 (i.e. IPA and IPB). In the preferred mode, each of these instruction processors is packaged on a single high density circuit board. The memory storage units 22 and 24 are coupled to storage controller 12 as explained above.

Network interface module 27 provides an interface to the operator console via cable 29. Cables 31 and 33 couple input/output complexes 18 and 20 to storage controller 12 (see also, FIG. 1). Other referenced elements are as previously described.

Figure 3:
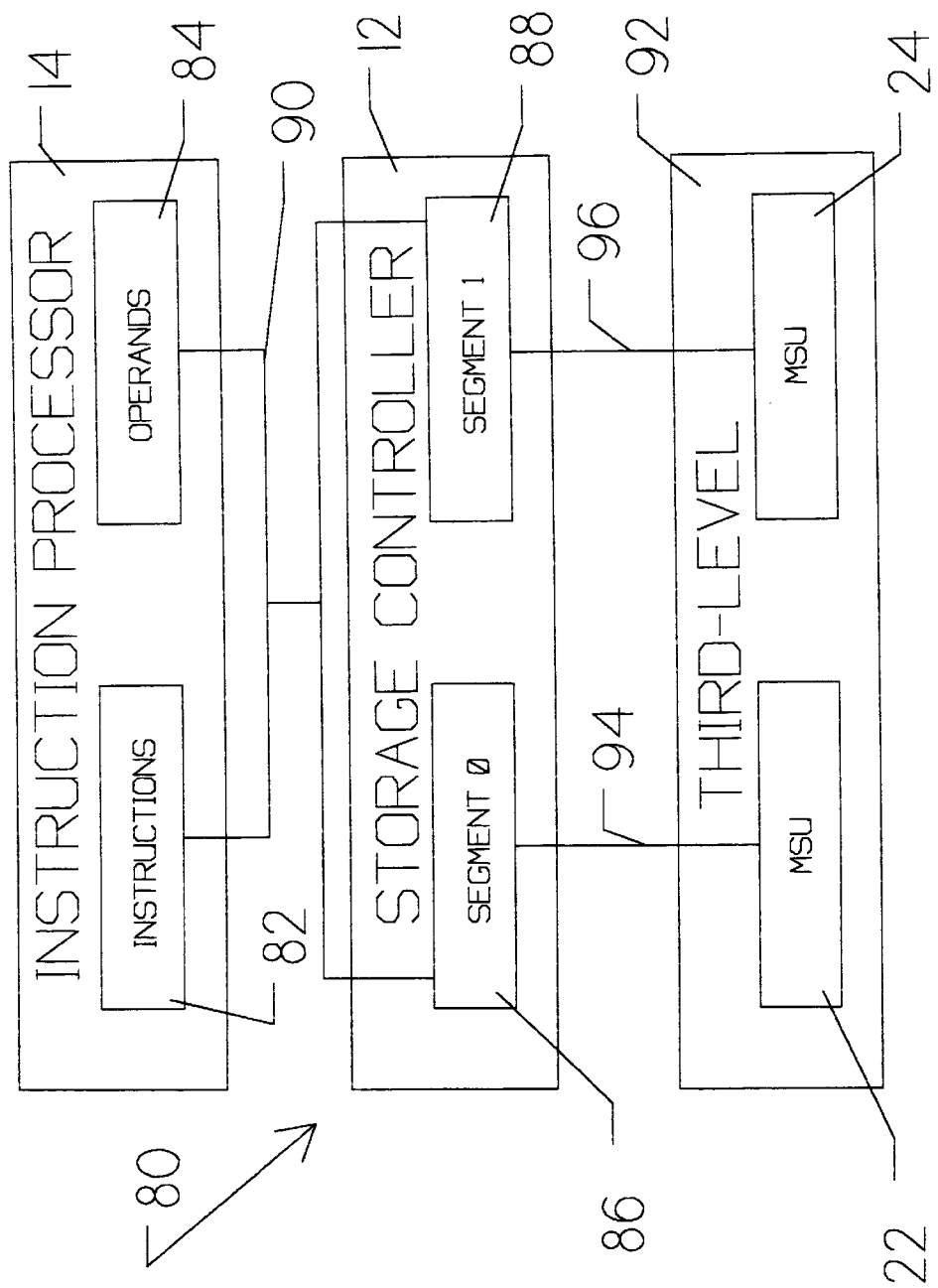
FIG. 3 is a block diagram of the levels of storage for a single instruction processor.

FIG. 3 is a flow diagram 80 showing the hierarchical arrangement of the three levels of storage within data processing system 10. Instruction processor 14 contains an instruction cache 82 and an operand cache 84, each storing 8k of 36 bit words. These are internal to instruction processor 14 and dedicated to the operations undertaken therein. By partitioning the internal dedicated cache resources in this manner, there is a certain concurrence of cache accesses associated with normal instruction execution.

Upon the request of instruction processor 14 to access a particular data element as either an instruction or operand, the directory of instruction cache 82 or operand cache 84, respectively, is queried to determine if the required data element is present within the associated cache resource. If the data element is present and valid, the access is completed at that level. If not, access is made to storage controller 12 via interface 90 for the block of eight 36 bit words containing the desired data element.

Storage controller 12 contains an intermediate level cache segment of 128k 36 bit words for each main memory module within the cluster. In the present illustration, storage controller 12 contains segment 0 cache 86 and segment 1 cache 88. These cache resources are shared by all users of the main memory within the cluster to include both local and remote users. Any memory request to storage controller 12 is routed to the appropriate directory of segment 0 cache 86 or segment 1 cache 88 to determine if the desired data element is present and valid. This routing is based upon the address requested, since the intermediate cache resources are partitioned in address space to correspond to the associated main memory module.

If present and valid, the requested data element is supplied as an eight word block. If the requested data element is not validly present in segment 0 cache 86 or segment 1 cache 88 (depending upon the requested address), the data is requested from third level storage 92 containing main memory modules 22 and 24 via interfaces 94 and 96, respectively. In the preferred mode, main memory modules 22 and 24 each contain 64 meg. words of storage.

Each data element request to storage controller 12 is made through a separate interface. For a fully populated system, this includes two instruction processors, two input/output complexes, and three other storage controllers (see also, FIG. 1). Each data element request is divided between segment 0 cache 86 and segment 1 cache 88 based upon the requested address. Only if the requested data element is not validly present in the appropriate intermediate level cache resource is an access request made to third level 92.

Figure 4:
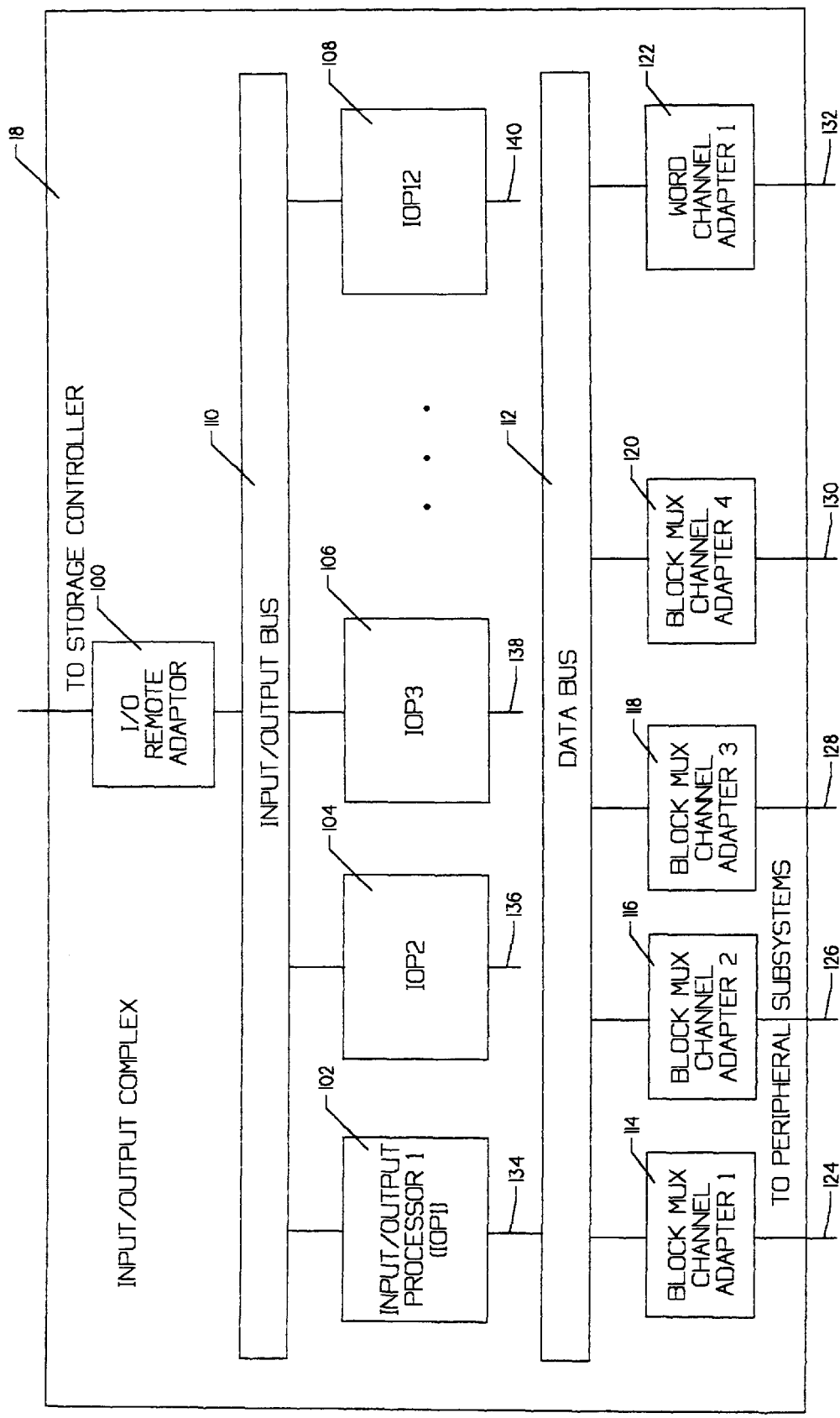
FIG. 4 is a block diagram showing the architecture of an input/output complex of the exemplary host.

FIG. 4 shows the architecture of an input/output complex 18 of data processing system 10. It is understood that input/output complex 18 is representative of input/output complexes 18, 20, 44, 46, 48, 50, 52, and 54. Input/output remote adaptor 100 is a non-intelligent adaptor which transfers data and messages between an associated storage controller (e.g., storage controller 12) and an associated input/output processor. The associated input/output processors are input/output processor 1 102, input/output processor 2 104, and input/output processor 3 106 through input/output processor 12 108. The data and messages are transferred to the associated input/output processor via an input/output bus 110. Input/output remote adaptor 100 occupies one physical dropout of the thirteen available on input/output bus 110, and has the highest priority of any unit connected to input/output bus 110. Input/output remote adaptor 100 does not participate in a rotational priority operation and can gain access to input/output bus 110 through a normal request process even when other units coupled to input/output bus 110 are operating in a rotational priority mode. Input/output bus 110 provides a communication path and protocol to transfer data between the attached units. Input/output bus 110 can accommodate twelve input/output processors. It is understood that bus architectures are well known in the prior art, and a further discussion of input/output bus 110 is not necessary for the purposes of the present invention.

Input/output processors 102, 104, and 106 through 108 are microprocessor controlled units that control the initiation, data transfer, and termination sequences associated with software generated I/O channel programs. Initiation and termination sequences are executed by the microprocessor (not shown), and data transfer is controlled by hard-wire logic (not shown). Each of input/output processor 102, 104, and 106 through 108 is coupled to a data bus 112, which in turn has available slots for up to four block space MUX channel adaptors labeled 114, 116, 118 and 120. Data bus 112 is also coupled to a word channel adaptor 122. Block MUX channel adaptor 1 114, block MUX channel adaptor 2 116, block MUX channel adaptor 3 118, block MUX channel adaptor 4 120 and word channel adaptor 1 122 are coupled to their respective =peripheral subsystems (not shown) via interfaces 124, 126, 128, 130 and 132, respectively. Input/output processor 1 102 is shown coupled to data bus 112 via interface 134. It is understood that input/output processor 2 104, and input/output processor 3 106 through input/output processor 12 108 are each coupled to an associated data bus (not shown). The other eleven data buses which are not shown provide connections for additional channel adaptors. Interfaces 136, and 138 through 140 represent the coupling between input/output processor 2 104, and input/output processor 3 106 through input/output processor 12 108, respectively, and their associated data buses.

Figure 5:
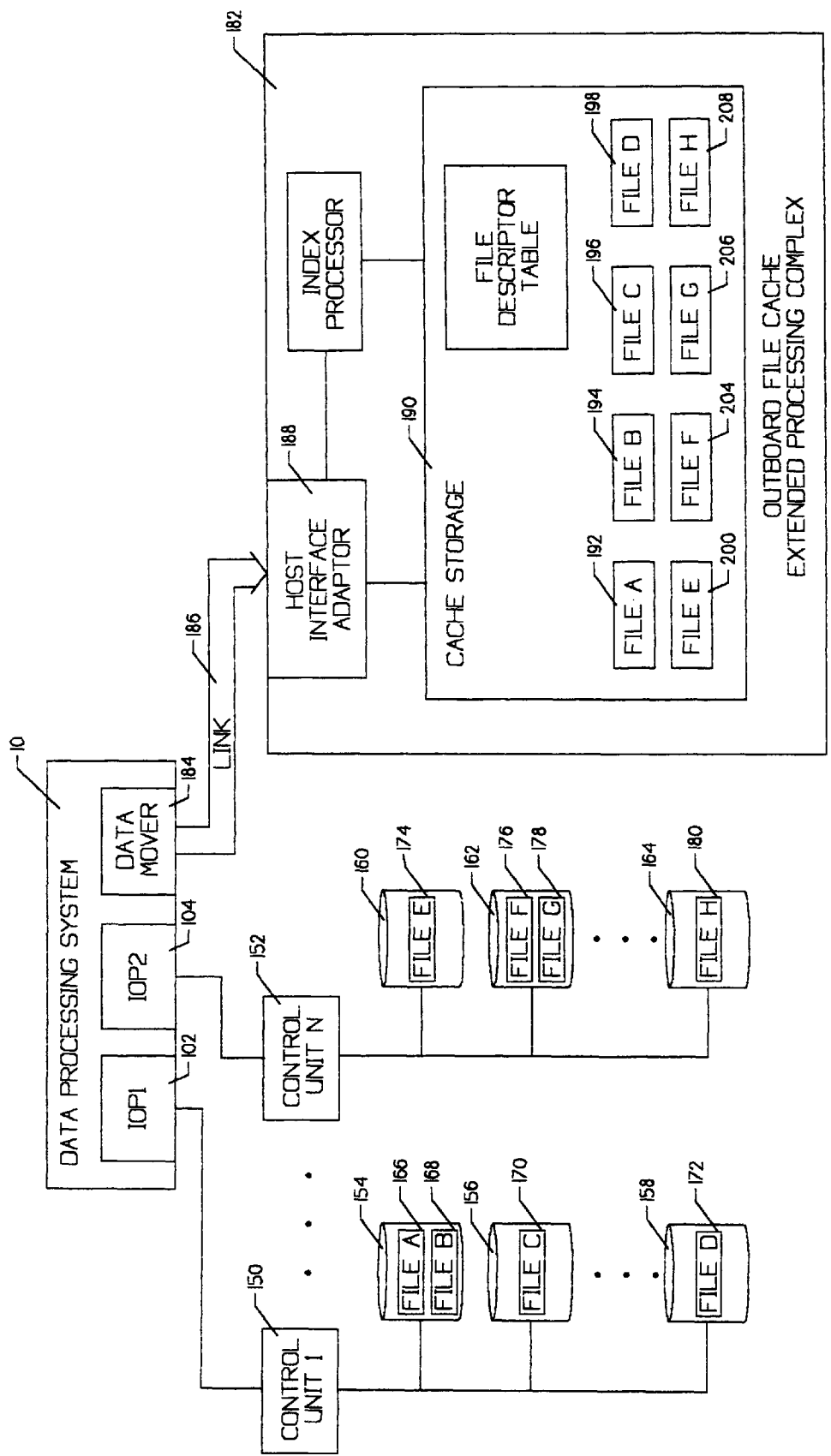
FIG. 5 is a block diagram of the outboard file cache in a data storage hierarchy.

FIG. 5 illustrates an outboard file cache in a data storage hierarchy. A plurality of control units labeled 150 through 152 are coupled to data processing system 10 via input/output processor 1 102 and input/output processor 2 104, respectively, for providing access to discs 154, 156 through 158, 160, and 162 through 164. Application and system software executing on data processing system 10 reads data from and writes data to files 166, 168, 170, 172, 174, 176, 178 and 180. While these files are depicted as blocks, it should be understood that the data is not necessarily stored contiguously on discs 154, 156 through 158, 160, and 162 through 164. These discs provide a backing store for retaining the files. In the storage hierarchy, discs would fall into the category of backup or secondary storage, with primary storage being the main memory modules of data processing system 10.

Extended processing complex 182 is an outboard cache storage for discs 154, 156 through 158, 160, and 162 through 164, having resiliency against data loss. A data mover 184 is coupled to input/output bus 110 (see FIG. 4) and provides a functionality which is similar to an input/output processor such as input/output processor 1 102. Data mover 184 provides a closely coupled, direct, high-speed communications link 186 to host interface adaptor 188 within extended processing complex 182.

All or part of files 166, 168, 170, 172, 174, 176, 178 and 180 may be stored within cache storage 190. The portion of files 166, 168, 170, 172, 174, 176, 178 and 180 that are stored in cache storage 190 are shown respectively as blocks 192, 194, 196, 198, 200, 204, 206 and 208. The cache portion of files 166, 168, 170, 172, 174, 176, 178 and 180 are labeled respectively as "file A", "file B", "file C", "file D", "file E", "file F", "file G", and "file H" for discussion purposes. Thus file A 166 is all or the portion of file A that is stored in file A 192. File B 168 is all or the portion of file B that is stored in File B 194, and so on for files C through H, respectively. Extended processing complex 182 allows references to cache files to be immediately directed to cache storage 190 for processing. It is also understood that cache storage 190 may be a non-volatile memory.

A more detailed discussion of the outboard file cache and the extended processing complex may be found in U.S. patent application Ser. No. 08/174,750, filed Dec. 23, 1993, entitled "Outboard File Cache System", and U.S. patent application Ser. No. 08/745,111, filed Nov. 7, 1996, entitled "Extended Processing Complex for File Caching", which have been incorporated herein by reference.

Figure 6:
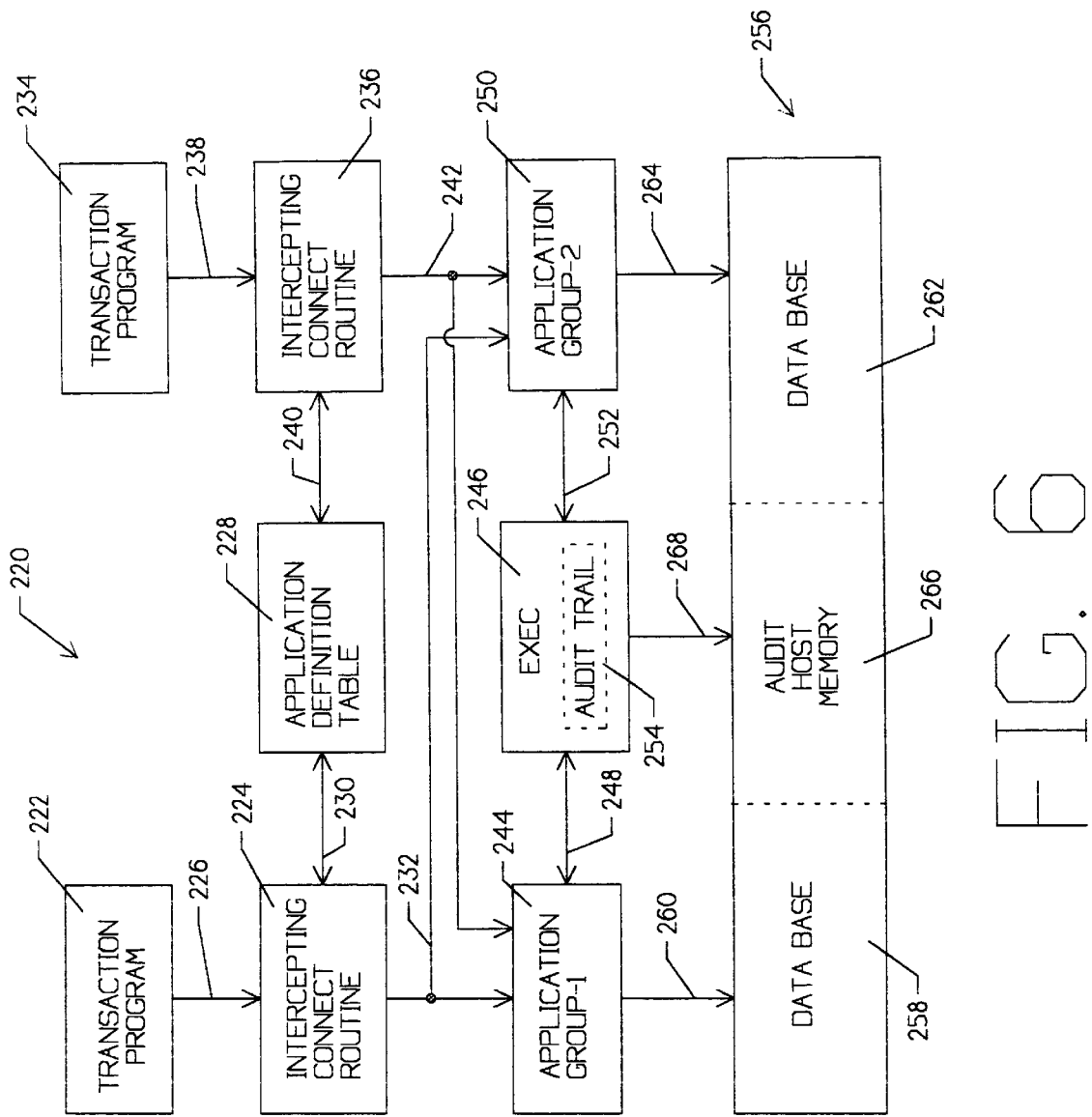
FIG. 6 is a block diagram showing an illustrative embodiment of the present invention.

FIG. 6 is a block diagram showing a preferred embodiment of the present invention. The block diagram is generally shown at 220. The preferred embodiment of the present invention provides backup memory storage for database transactions within a computer system having a main memory storage, a non-volatile memory storage, and a backup memory storage. In the preferred embodiment, the main memory storage may be one of memory modules 22, 24, 56, 58, 60, 62, 64, and 66 of data processing system 10 (see FIG. 1). The non-volatile memory storage may be the outboard file cache within extended processing complex 182. Within the scope of the present invention, the non-volatile memory storage may be within the extended processing complex associated with any of the input/output complexes 18, 20, 44, 46, 48, 50, 52, and 54.

The backup memory storage may be a magnetic tape storage medium or disk drive such as one of disks 154, 156 through 158, 160, and 162 through 164 (see FIG. 5). Within the scope of the present invention, the backup memory storage may be a magnetic tape storage medium or disk drive associated with any of the input/output complexes 18, 20, 44, 46, 48, 50, 52, and 54.

In the preferred embodiment, the main memory storage, the non-volatile memory storage, and the backup memory storage may be considered remote if associated with a remote storage controller. That is, the first data processing system having the resources accompanying storage controller 12 may access he second data processing system having the resources accompanying storage controller 26, the third data processing system having the resources accompanying storage controller 28, or the fourth data processing system having the resources accompanying storage controller 30, where the three latter data processing systems are considered to be remote to the first data processing system. Furthermore, the remote access may be accomplished through any number of communications networks, including, but not limited to, local area networks, telephone communication lines, and satellite uplinks.

In the preferred embodiment, data processing system 10 executes a number of transaction programs which generate a number of database transactions which contain audit trail data. As the database transactions are executed, requests are received to store a portion of the number of database transactions into a portion of the main memory storage to create an audit trail.

Referring to FIG. 6, a first transaction program 222 and a second transaction program 234 may be executed on data processing system 10. It is contemplated that any number of transaction programs may be provided within data processing system 10. First transaction program 222 may access one or more databases through a number of "application groups". An application group is a logical partition of the exemplary computer system wherein each of the application groups can be independently recovered following a system fault. In the referred embodiment, an application group-1

244 and an application group-2 250 may be provided. It is contemplated that any number of application groups may be provided within data processing system 10.

Each transaction program 222 and 234 may be mapped to at most one application group 244 or 250. However, it is recognized that the present invention is not limited to such a configuration. The mapping of the first transaction program 222 and second transaction program 234 to the application groups 244 and 250 may be controlled by an intercept and connect routine. First transaction program 222 may be coupled to an intercept connect routine 224 via interface 226. Second transaction program 234 may be coupled to intercept connect routine 236 via interface 238. The transaction program makes a request for access to a program group database which is a partition of system database 256. In the preferred embodiment, system database 256 comprises a portion of the main memory storage within data processing system 10. When a transaction program makes a request for access to a program group database which is a partition of system database 256, the corresponding intercept and connect routine determines which application group should be assigned thereto by consulting an application definition table 228. That is, intercept connect routine 224 may determine which of the application groups 244 or 250 to assign to transaction program 222. Intercept connect routine 224 may consult application definition table 228 via interface 230 to help determine the appropriate application group. Similarly, intercept connect routine 236 may determine which of the application groups 244 or 250 to assign to transaction program 234. Intercept connect routine 236 may consult application definition table 228 via interface 240 to help determine the appropriate application group.

Application definition table 228 may contain predetermined information about each application group including, but not limited to, the memory locations assigned thereto, etc. In this configuration, one application group may be configured to support a large transaction program having large memory requirements, while another application group may be configured to support a small transaction program. In this way, transaction program requirements may be matched to a suitable application group thereby minimizing the amount of wasted system resources. After the intercept and connect routines 224 and 236 make the application group assignments, transaction programs 222 and 234 may access system database 256 via the assigned application group for the duration of the corresponding transaction program's execution.

Application group-1 244 may be coupled to the program group-1 partition 258 of database 256 via interface 260 and may be further coupled to an executive 246 via interface 248. Similarly, Application group-2 250 may be coupled to the program group-2 partition 262 of database 256 via interface 264 and may be further coupled to the executive 246 via interface 252. Executive 246 maintains an audit trail 254 for all local database transactions. As transaction programs 222 or 234 execute, their audit data is received and executive 246 copies the audit trail into audit host memory 266 via interface 268. In the preferred embodiment, audit host memory 266 is contained within system database 256. A more detailed discussion of the above described system may be found in U.S. patent application Ser. No. 08/397,429, entitled "Method for Making a Database Available to a User Program During Database Recovery", which has been incorporated herein by reference.

Figure 7:
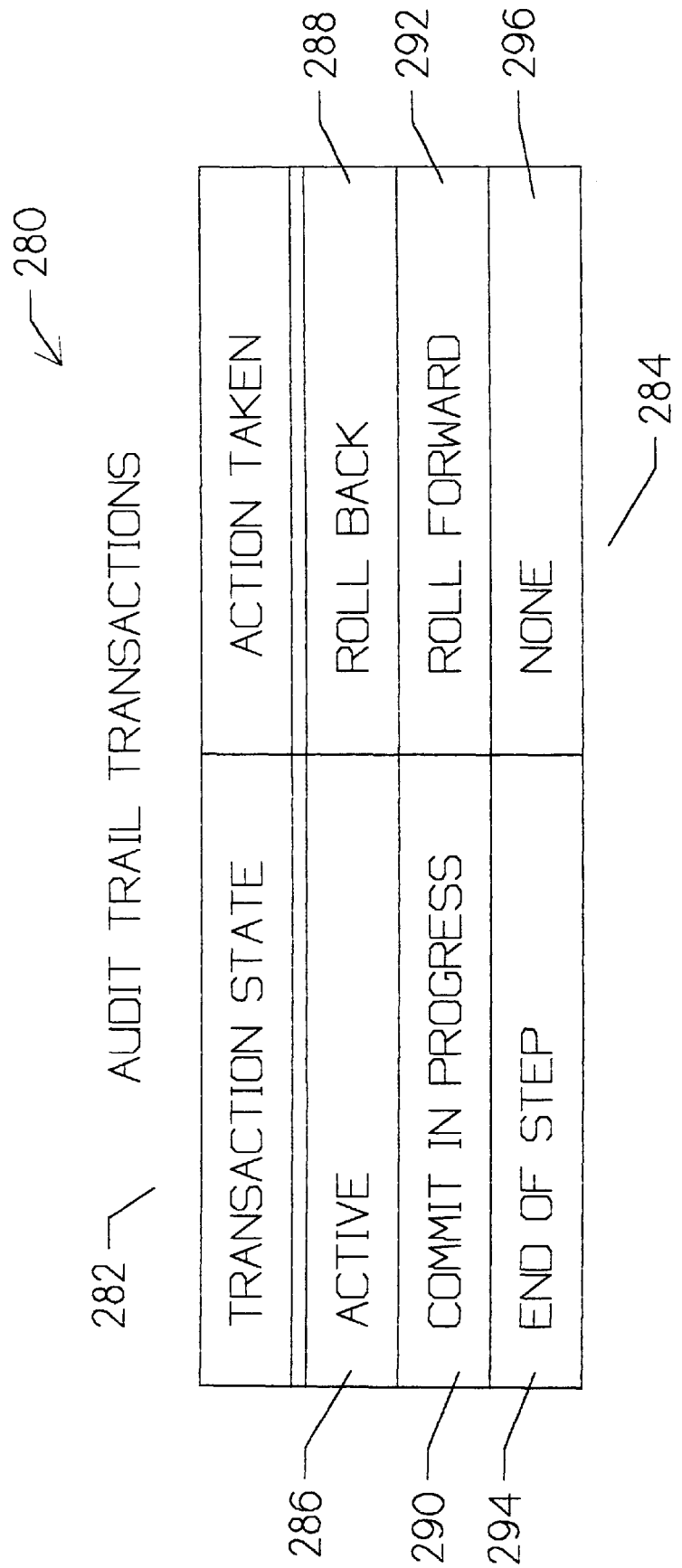
FIG. 7 is a table showing a number of illustrative transaction states that may be maintained by the audit trail file of the illustrative embodiment shown in FIG. 6.

FIG. 7 is a table showing a number of exemplary transaction states that may be maintained by the audit trail 254 of the exemplary embodiment shown in FIG. 6. These transaction states may be maintained by the audit trail for any number of reasons, including fault recovery. If a fault is detected, the transaction states may be used to recover from an incomplete transaction step.

The table is generally shown at 280. A first column 282 of table 280 contains the various transaction states that may be maintained. A second column 284 of table 280 briefly describes an exemplary action that may be taken, for each of the corresponding states shown in the first column 282 of table 280, if a fault should occur. It is recognized that other states may also be maintained, and that other actions may be taken, and still be within the scope of the present invention.

Executive 246 may record the status of each database transaction in audit host memory 266. For local transaction steps, the status may include an "active" state 286, a "commit in progress" state 290, and an "end of step" state 294. If a fault is detected in a corresponding application group 244 and/or 250, the recorded status may be used to determine the fate of an incomplete transaction step. If the fault occurred when a corresponding transaction step was in the "active" state 286, indicating that the transaction step was currently being processed, the transaction step may be rolled back so that the database may look as if the step had never been processed, as shown at 288. This may be accomplished by consulting the audit trail and reversing any intermediate changes indicated therein. When the transaction is in the "active" state, the transaction has been stored in audit host memory 266, not in the non-volatile memory or the backup memory storage, and may not be available for recovery.

If the fault occurs when the transaction step was in the "commit in progress" state 290, indicating that the transaction step had reached a point where the updates had been saved, the corresponding step may be rolled forward so that the database may look as if the step had been completed successfully, as shown at 292. When the transaction has a "commit in progress" state, a synchronous audit data request is made to write the current contents of the audit host memory 266 to a non-volatile memory storage area. The transaction having a "commit in progress" state means it has reached a point where the transaction program cannot further execute the transaction without creating a backup for the audit trail. Once the backup has been saved, the corresponding step may be rolled forward if the fault occurs.

If the fault occurred when a transaction step was in the "end of step" state 294, indicating the transaction step has been completed, no action may be required, as shown at 296. When the transaction has reached the "end of step" state, a synchronous audit data request is made to write the current contents of the audit host memory 266 to a non-volatile memory storage area. The transaction having reached the "end of step" state means it has been completed and a backup must be created for the audit trail. Since the backup has been saved once the "end of step" state is reached, no action is required if the fault occurs.

Every transaction step that was in progress at the time of the fault may be addressed in this manner before any further transactions access the database via a corresponding application group. This may be necessary to maintain data coherency, and may further allow the user program to be restarted at a point which corresponds to just prior to the detection of the fault.

Figure 8:
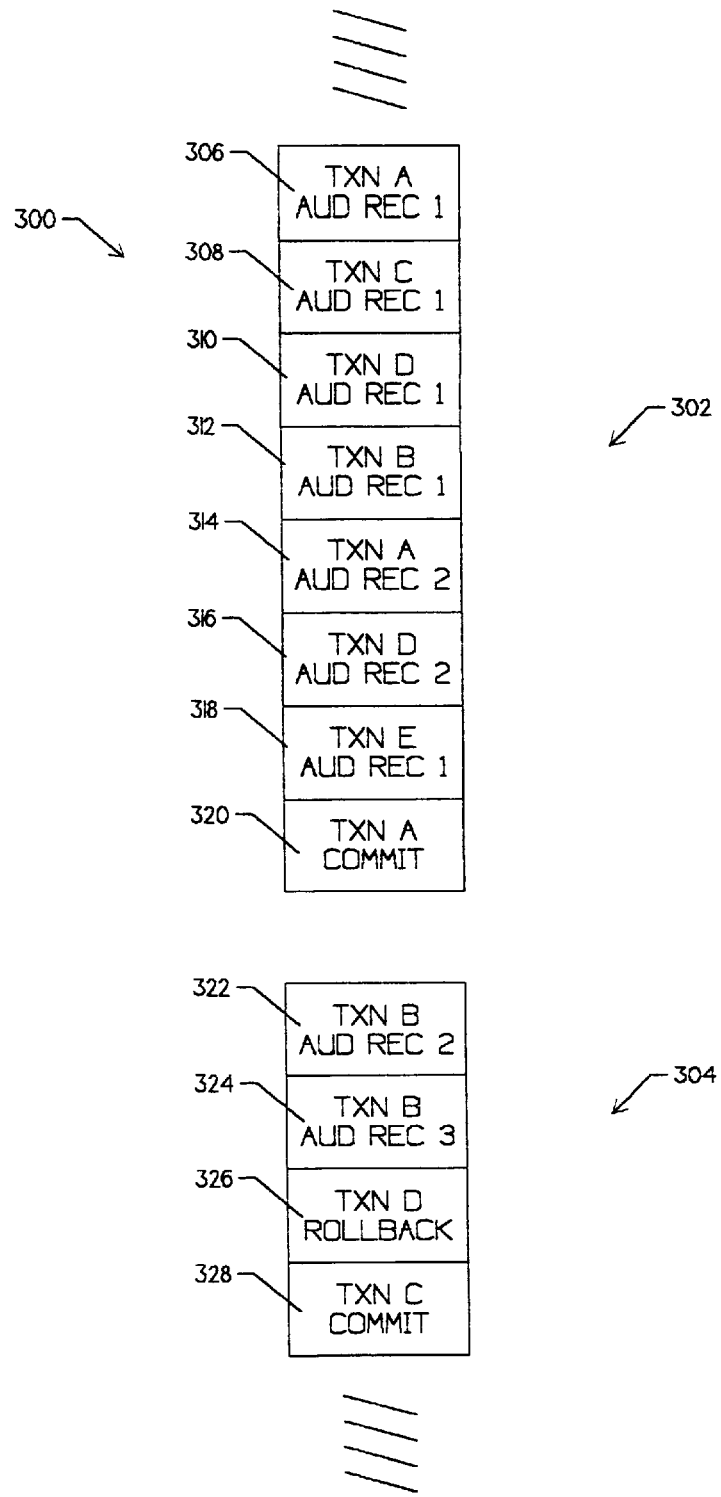
FIG. 8 is a diagram showing the format of the audit trail transactions stored in memory.

FIG. 8 is a diagram showing the format of the audit trail transactions stored in memory. The diagram is generally shown at 300. In the preferred embodiment of the present invention, the audit trail capability is provided to record database changes and message processing activity while a transaction program is executing. This provides database and message recovery if a data processing system failure should occur. The audit trail contents reflect the indivisible valid states for the transaction process environment as a result of each transaction program.

Referring to FIG. 8, as transactions are executed, the audit data from each transaction execution is accumulated over the life of the transaction and is written into audit host memory 266. The audit trail is shown generally at 300, and illustrates the format in which the audit data is copied into audit host memory 266. Audit trail 300 is comprised of a block 302 and a block 304, wherein each block may contain any number of transactions. Thus, in the exemplary audit trail 300, audit data is received for transactions A, B, C, D, and E. In block 302, audit record 1 for transaction A 306 is received by audit host memory 266. In a likewise fashion, audit record 1 for transaction C 308, audit record 1 for transaction D 310, audit record 1 for transaction B 312, audit record 2 for transaction A 314, audit record 2 for transaction D 316, and audit record 1 for transaction E 318 are received and saved within audit host memory 266 in a chronological order. When the commit transaction for transaction A 320 is stored within audit host memory 266, a synchronous audit data request is made to write the audit trail data contained within block 302 to the non-volatile memory. The commit transaction provides an indication of a "commit in progress" status. Block 304 contains audit record 2 for transaction B 322, audit record 3 for transaction B 324, and a roll-back for transaction D 326. When the commit transaction for transaction C 328 is stored within audit host memory 266, a synchronous audit data request is made to write the audit trail data contained within block 304 to the non-volatile memory.

It is understood that within the scope of the present invention, any number of blocks 302 or 304 may be saved within audit host memory 266, and that each block may have any number of audit trail transaction records.

Figure 9:
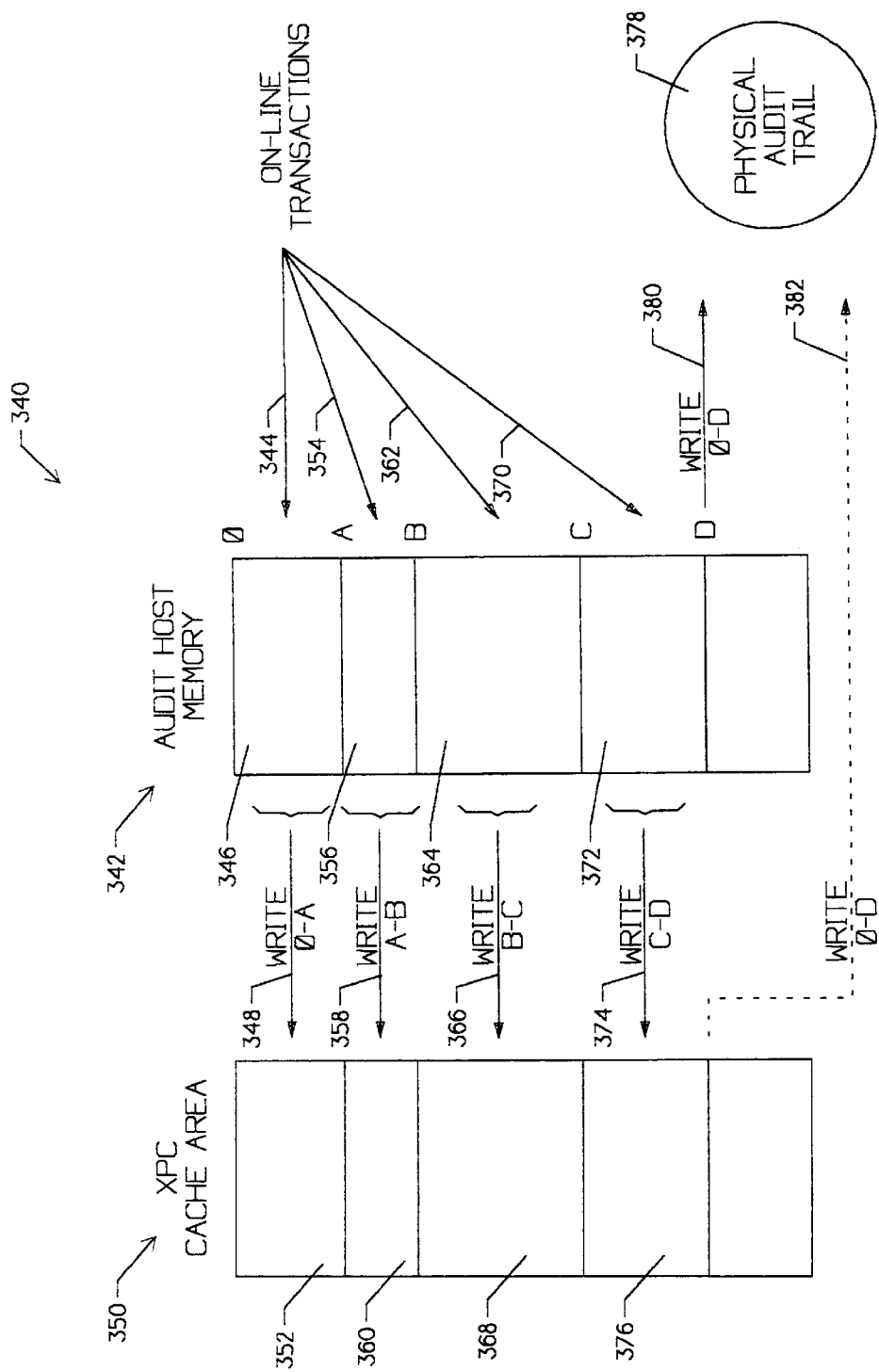
FIG. 9 is a diagram illustrating a preferred embodiment of the present invention.

FIG. 9 is a diagram illustrating a preferred embodiment of the present invention. The diagram is shown generally at 340. As on-line transactions execute, their audit data is received and written into audit host memory 342. In the preferred embodiment, audit host memory 342 is a graphical representation of audit host memory 266 as disclosed in FIG. 6. The database transactions or on-line transactions are accumulated in audit host memory 342 until a commit transaction is received. A commit transaction is a transaction which has a commit in progress status. The commit in progress status is an indication which comprises a synchronous audit data request. The synchronous audit data request results in a portion of the contents of audit host memory 342 being written to a corresponding portion of non-volatile memory storage such as XPC cache area 350.

Arrow 344 represents on-line transactions being accumulated within memory space 346 of audit host memory 342 from 0–A. Point A is when the commit transaction is received and written into audit host memory 342. Within audit host memory 342, 0–A, A–B, B–C and C–D represent exemplary address ranges. Thus arrow 344 may represent block 302 of audit trail 300 being written into memory space 346 (see also, FIG. 8). Once transaction A 320 is received, the synchronous audit data request being made at point A results in the contents of audit host memory 342 within memory space 346 from 0–A being written via path 348 to cache space 352 of XPC cache area 350.

As more audit data is received, the on-line transactions are written via arrow 354 to memory space 356 within audit host memory 342 from A–B. The on-line transactions written into memory space 356 may be block 304 of audit trail 300. Once transaction C 328 is received, the synchronous audit data request being made at point B results in the contents of audit host memory 342 within memory space 356 from A–B being written via path 358 to cache space 360 of XPC cache area 350. In a likewise fashion, on-line transactions may be accumulated via arrow 362 into memory space 364 of audit host memory 342 until a synchronous audit data request is made at point C. The contents of memory space 364 are then written via path 366 into cache space 368. On-line transactions may be accumulated via arrow 370 into memory space 372 until a synchronous audit data request is made at point D. The contents of memory space 372 are then written via path 374 into cache space 376.

At each synchronous audit data request, executive 246 determines if a sufficient number of on-line transactions have been accumulated into audit host memory 342 to warrant an optimal transfer to physical audit trail 378 via path 380. In the diagram at 340, executive 346 determines after memory space 372 is written into cache space 376 that a sufficient number of transactions have been accumulated in audit host memory 342. These transactions include the memory spaces at 346, 356, 364 and 372 and range from 0–D. At this point, the contents of audit host memory 342 from 0–D are written to physical audit trail 378 via path 380. In an alternative embodiment, the contents of XPC cache area 350 including cache space 352, cache space 360, cache space 368 and cache space 376 may be written to physical audit trail 378 via path 382.

Writing the contents of audit host memory 342 from 0–D as one large block provides for better media utilization within physical audit trail 378 and a more optimal transfer to physical audit trail 378. In the preferred embodiment, the optimal transfer characteristics of physical audit trail 378 may determine when a sufficient number of transactions have been accumulated in audit host memory 342. Thus the optimal transfer efficiency may correspond to a predetermined size of audit host memory 342. The size may correspond to a predetermined number of address locations within audit host memory 342. The optimal transfer efficiency may also correspond to a predetermined number of audit trail entries having been accumulated within audit host memory 342.

It is understood that in the preferred embodiment, physical audit trail 378 may be a disk storage device such as one of discs 154, 156 through 158, 160, and 162 through 164 (see also, FIG. 5). Physical audit trail 378 may also be a magnetic tape storage device. With the disk storage device or magnetic tape storage device, the optimal transfer efficiency achieved when writing the contents of audit host memory 342 from 0–D corresponds to an optimal media utilization due to the format in which data is stored on the disk or tape.

In the preferred embodiment, if data processing system 10 should experience a failure, on-line transactions secure within XPC cache area 350 may be recovered and transferred to physical audit trail 378. In the preferred embodiment, XPC cache area 350 is the outboard file cache or cache storage 190 of extended processing complex 182. XPC cache area 350 may be a non-volatile memory. The non-volatile memory may be any memory that retains data when power is removed. For example, the non-volatile memory may be a magnetic memory. The non-volatile memory may also be a disk storage device or a magnetic tape storage device It is further understood that in the preferred embodiment, audit host memory 342 may represent a first memory, XPC cache area 350 may represent a second memory, and physical audit trail 378 may represent a third memory. It is further understood that the first memory, second memory and third memory may be any three memories within data processing system 10 and be within the scope of the present invention. For example, the first memory may be a main memory storage and the second memory may be a non-volatile memory. Alternatively, the first memory may be a non-volatile memory and the second memory may be a main memory storage. In addition, the first memory may be a non-volatile memory and the second memory may be a non-volatile memory.

Furthermore, within the scope of the present invention, each data processing system or partition may further be contained within a unique power domain. Thus each of the first memory, the second memory, or the third memory may be contained within one or more unique power domains. For example, if the second memory or XPC cache area 350 is contained within a different power domain than the first memory or audit host memory 350, the second memory or XPC cache area 350 would not lose data or otherwise be affected by a power loss affecting the first memory or audit host memory 350. Thus the second memory or XPC cache area 350 would be a non-volatile memory by virtue of being resident in the unique power domain. Furthermore, the third memory may be within a remote data processing system wherein the remote data processing system is contained within a unique power domain.

One or more of main memory modules 22, 24, 56, 58, 60, 62, 64 or 66 may also be used for the physical audit trail. In this alternative embodiment, audit host memory 342 writes via path 380 to a mass storage audit trail file. The mass storage audit trail file is a portion of the memory space within the main memory modules. Transactions are written to audit host memory 342, and transferred to XPC cache area 350, as in the preferred embodiment. In the alternative embodiment, when executive 246 determines an optimal number of transactions have been accumulated in audit host memory 342, the contents of audit host memory 342 from 0–D are written to the mass storage audit trail file, and the corresponding cache space within XPC cache area 350 may be refreshed for reuse. In yet another alternative embodiment, destage logic within extended processing complex 182 may be used to write XPC cache area 350 to the mass storage audit trail file.

Figure 10:
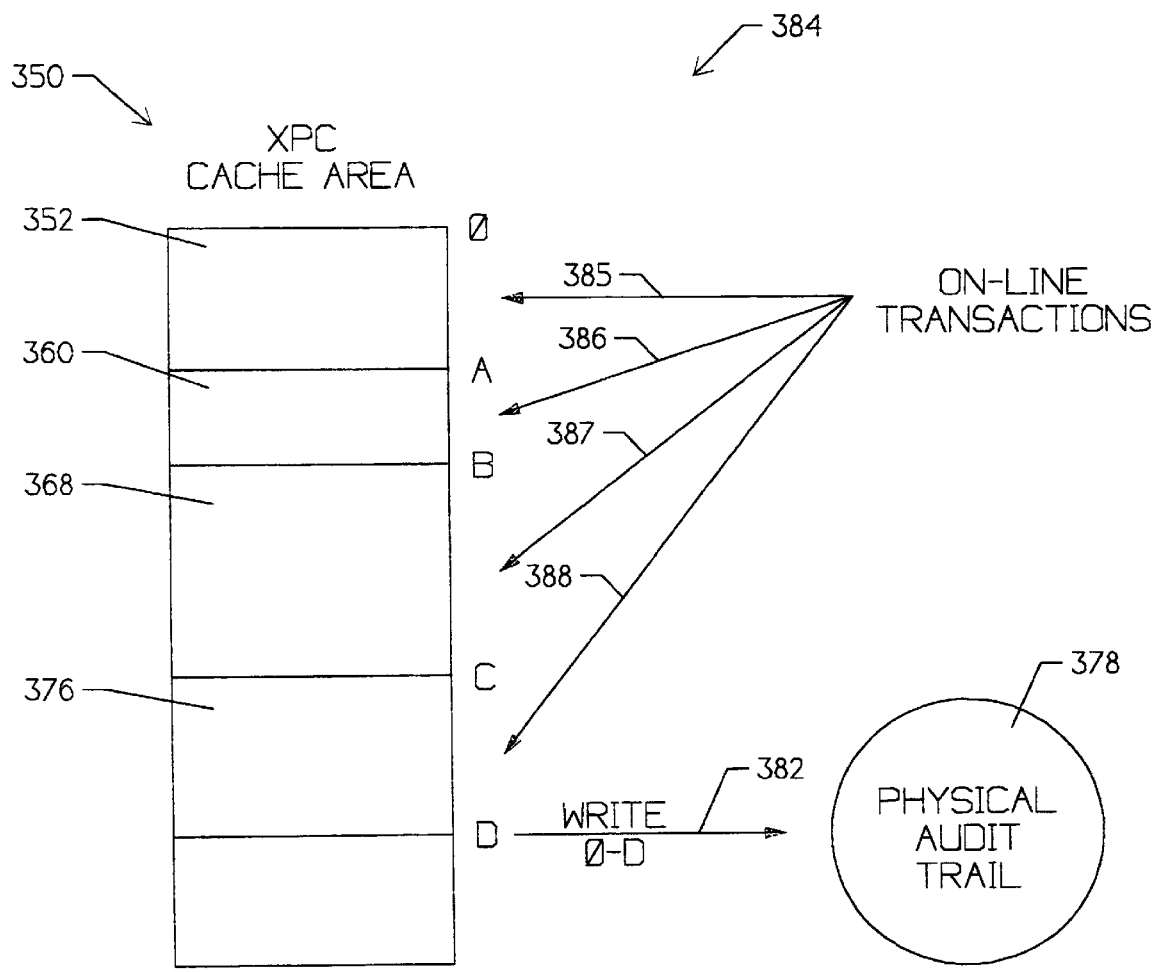
FIG. 10 is a diagram illustrating an alternative embodiment of the present invention.

FIG. 10 is a diagram illustrating an alternate embodiment of the present invention. The diagram is shown generally at 384. As on-line transactions execute, their audit data is received and written into XPC cache area 350. Within XPC cache area 350, 0–A, A–B, B–C and C–D represent exemplary address ranges into which the audit data is written. For example, arrow 385 represents on-line transactions being accumulated within cache space 352 from 0–A. Point A (as well as points B, C and D) represent where a transaction received and written into XPC cache area 350 has a commit in progress status. The database transactions or on-line transactions are accumulated in XPC cache area 350 until a transaction has a commit in progress status. The commit in progress status is an indication which comprises a synchronous audit data request.

At each synchronous audit data request, executive 246 determines if a sufficient number of on-line transactions have been accumulated into XPC cache area 350 to warrant an optimal transfer to physical audit trail 378 via path 382. Arrow 385 may represent block 302 of audit trail 300 being written into cache space 352 (see also, FIG. 8). Once transaction A 320 is received, the synchronous audit data request being made at point A results in the determination being made as to whether a sufficient number of on-line transactions have been accumulated into XPC cache area 350 to warrant the transfer to physical audit trail 378. If a sufficient number of on-line transactions have not been received, additional audit data is received and written via arrow 386 to cache space 360 within XPC cache area 350 from A–B. The on-line transactions written into cache space 360 may be block 304 of audit trail 300. Once transaction C 328 is received, the synchronous audit data request being made at point B results in the determination being made as to whether a sufficient number of on-line transactions have been accumulated into XPC cache area 350 to warrant the transfer to physical audit trail 378. If a sufficient number of on-line transactions have not been received, on-line transactions may continue to be accumulated via arrow 387 into cache space 368 of XPC cache area 350 until a synchronous audit data request is made at point C. Again if a sufficient number of on-line transactions have not been received, on-line transactions may continue to be accumulated via arrow 388 into memory space 376 until a synchronous audit data request is made at point D. At point D, executive 246 determines that a sufficient number of on-line transactions have been accumulated into XPC cache area 350 to warrant an optimal transfer to physical audit trail 378 via path 382. Once executive 246 determines that a sufficient number of transactions have been accumulated in XPC cache area 350, the contents of XPC cache area 350 from 0–D are written to physical audit trail 378 via path 382. The contents of XPC cache area 350 from 0–D include cache spaces 352, 360, 368 and 376.

Writing the contents of XPC cache area 350 from 0–D as one large block provides for better media utilization within physical audit trail 378 and a more optimal transfer to physical audit trail 378. In the alternate embodiment, the optimal transfer characteristics of physical audit trail 378 may determine when a sufficient number of transactions have been accumulated in XPC cache area 350. Thus the optimal transfer efficiency may correspond to a predetermined size of XPC cache area 350. The size may correspond to a predetermined number of address locations within XPC cache area 350. The optimal transfer efficiency may also correspond to a predetermined number of audit trail entries having been accumulated within XPC cache area 350.

It is understood that in the alternate embodiment, physical audit trail 378 may be a disk storage device such as one of discs 154, 156 through 158, 160, and 162 through 164 (see also, FIG. 5). Physical audit trail 378 may also be a magnetic tape storage device. With the disk storage device or magnetic tape storage device, the optimal transfer efficiency achieved when writing the contents of XPC cache area 350 from 0–D corresponds to an optimal media utilization due to the format in which data is stored on the disk or tape. Physical audit trail 378 may also be a portion of the main memory storage where the main memory storage is one of memory modules 22, 24, 56, 58, 60, 62, 64, and 66 of data processing system 10 (see FIG. 1).

In the alternate embodiment, if data processing system 10 should experience a failure, on-line transactions secure within XPC cache area 350 may be recovered. In the alternate embodiment, XPC cache area 350 is the outboard file cache or cache storage 190 of extended processing complex 182. XPC cache area 350 may be a non-volatile memory. The non-volatile memory may be any memory that retains data when power is removed. For example, the non-volatile memory may be a magnetic memory. The non-volatile memory may also be a disk storage device or a magnetic tape storage device It is further understood that in the alternate embodiment, XPC cache area 350 may represent a first memory and physical audit trail 378 may represent a second memory. It is understood that the first memory and second memory may be any two memories within data processing system 10 and be within the scope of the present invention. For example, the first memory may be a non-volatile memory. The non-volatile memory may be a cache memory. The second memory may be a magnetic tape storage medium. The second memory may be a disk storage device. The second memory may also be a main memory storage.

Furthermore, within the scope of the present invention, each data processing system or partition may further be contained within a unique power domain. Thus the first memory and the second memory may each be contained within a unique power domain. For example, the XPC cache area 350 may be contained within a different power domain than the physical audit trail 378.

Figure 11A:
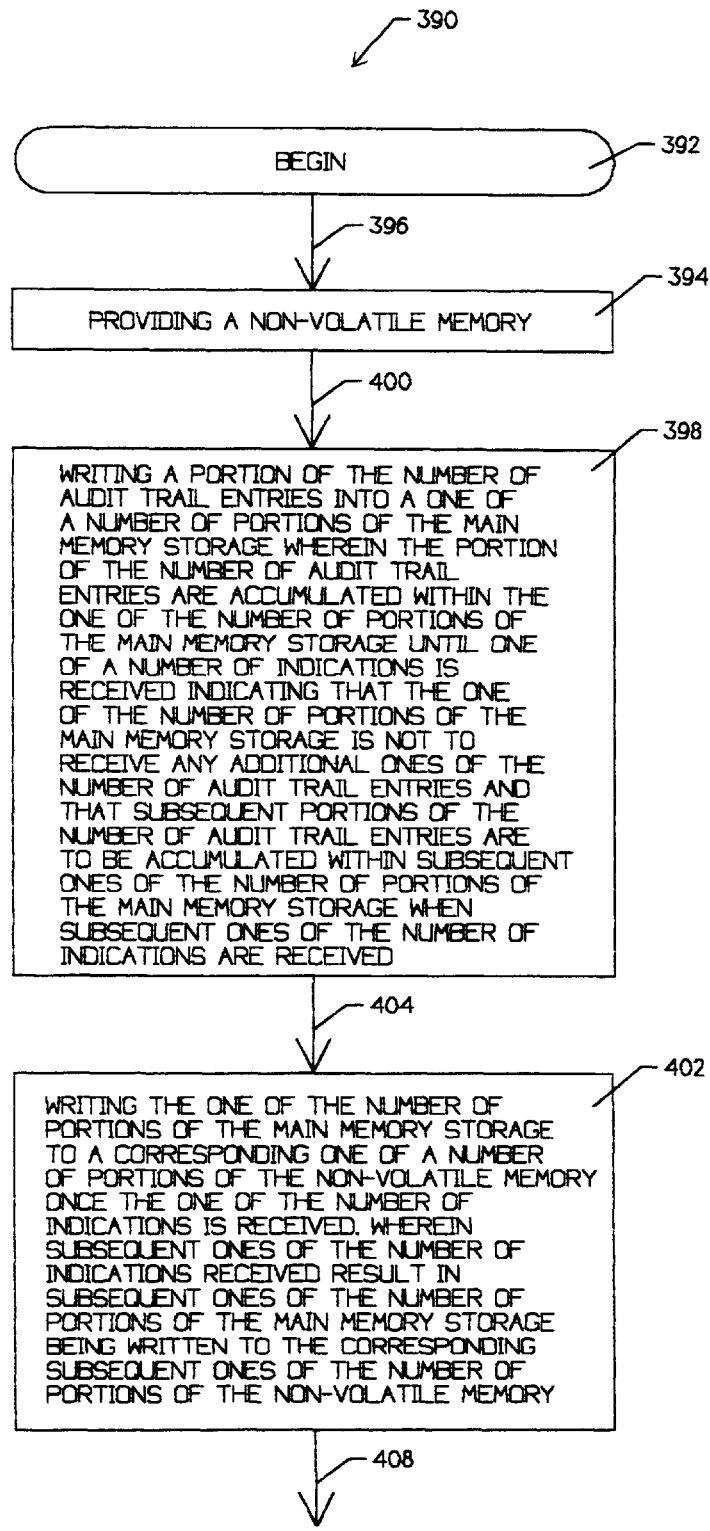
FIGS. 11A–11B are a flow diagram showing an illustrative method of the present invention.
Figure 11B:
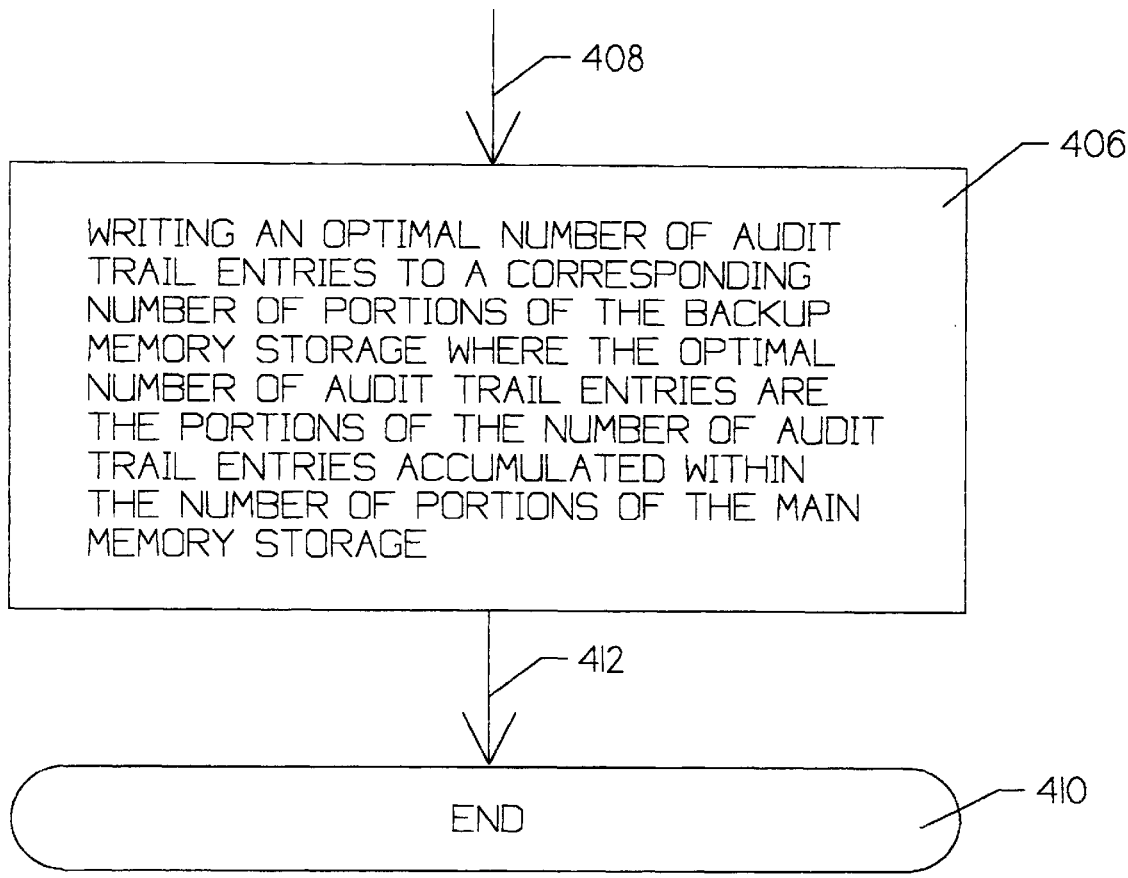

FIGS. 11A and 11B are a flow diagram showing an exemplary method of the present invention. The diagram is shown generally at 390. The flow diagram is entered at element 392, wherein control is passed to element 394 via interface 396. Element 394 provides a non-volatile memory. Control is then passed to element 398 via interface 400. Element 398 writes a portion of the number of audit trail entries into a one of a number of portions of the main memory storage wherein the portion of the number of audit trail entries are accumulated within the one of the number of portions of the main memory storage until one of a number of indications is received indicating that the one of the number of portions of the main memory storage is not to receive any additional ones of the number of audit trail entries. Element 398 further provides that subsequent portions of the number of audit trail entries are to be accumulated within subsequent ones of the number of portions of the main memory storage when subsequent ones of the number of indications are received. Control is then passed to element 402 via interface 404. Element 402 writes the one of the number of portions of the main memory storage to a corresponding one of a number of portions of the non-volatile memory once the one of the number of indications is received, wherein subsequent ones of the number of indications received result in subsequent ones of the number of portions of the main memory storage being written to the corresponding subsequent ones of the number of portions of the non-volatile memory. Control is then passed to element 406 via interface 408. Element 406 writes an optimal number of audit trail entries to a corresponding number of portions of the backup memory storage where the optimal number of audit trail entries are the portions of the number of audit trail entries accumulated within the number of portions of the main memory storage. Control is then passed to element 410 via interface 412, where the algorithm is exited.

Figure 12A:
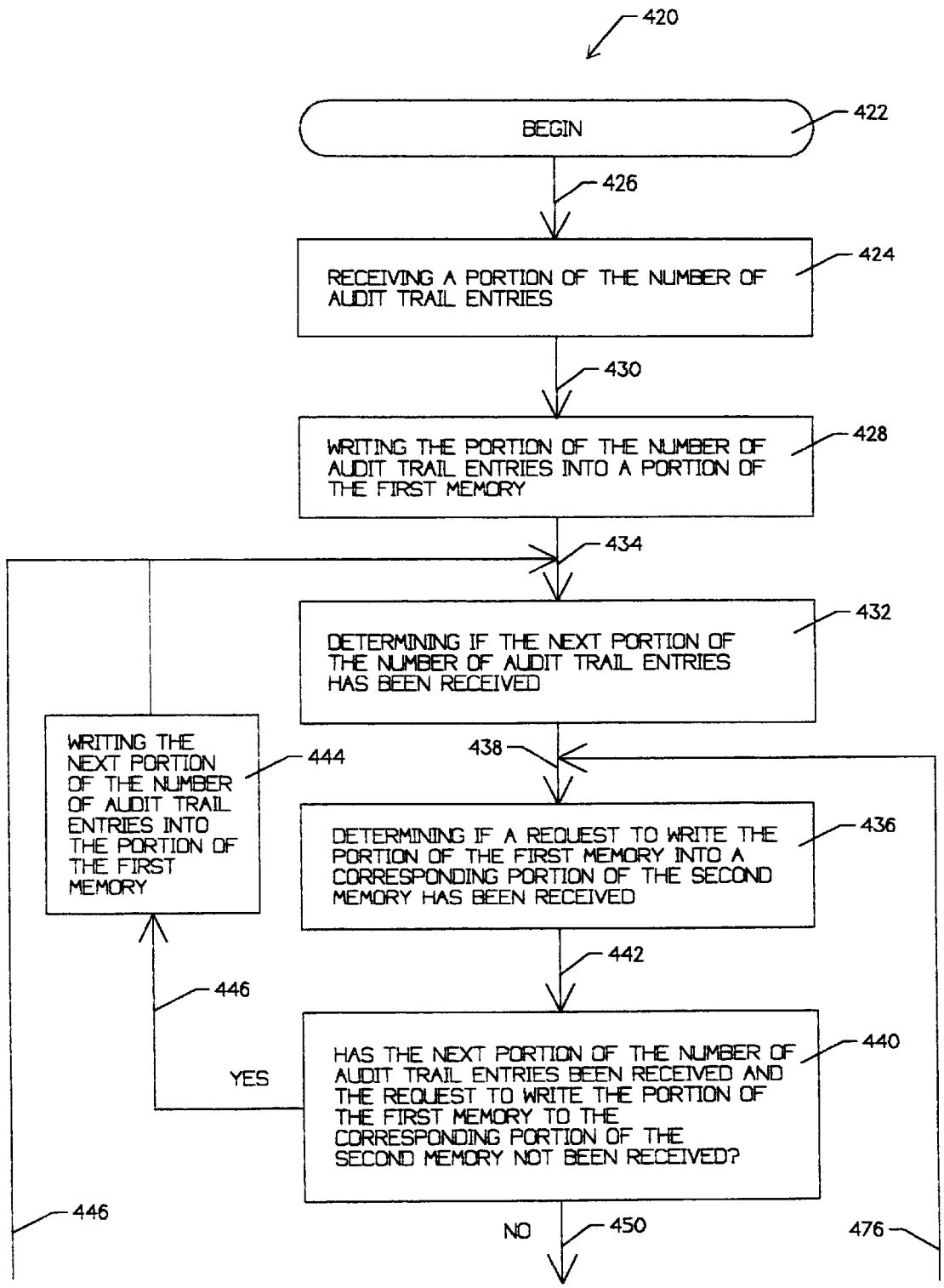
FIGS. 12A–12C are a second flow diagram showing another illustrative method of the present invention.
Figure 12B:
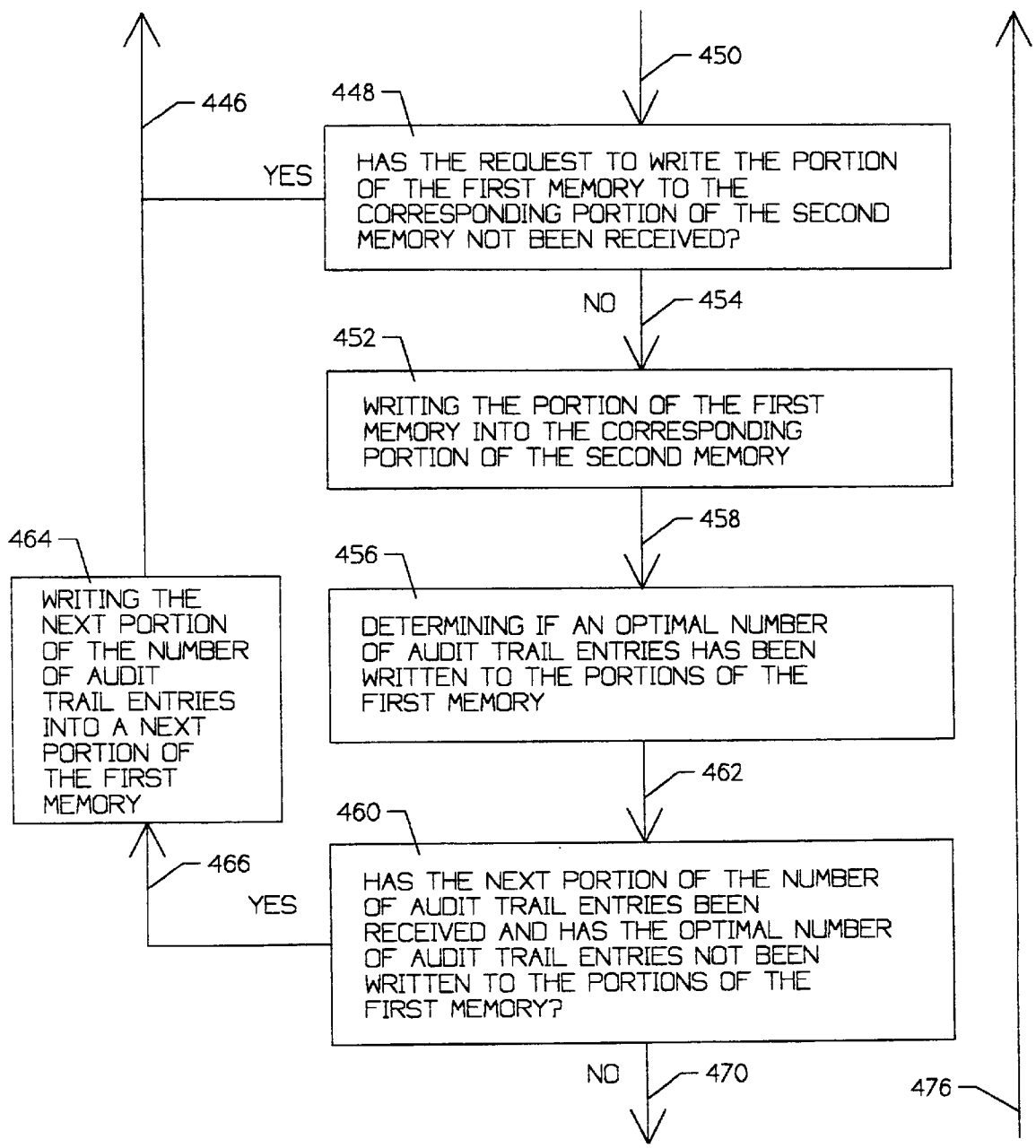
Figure 12C:
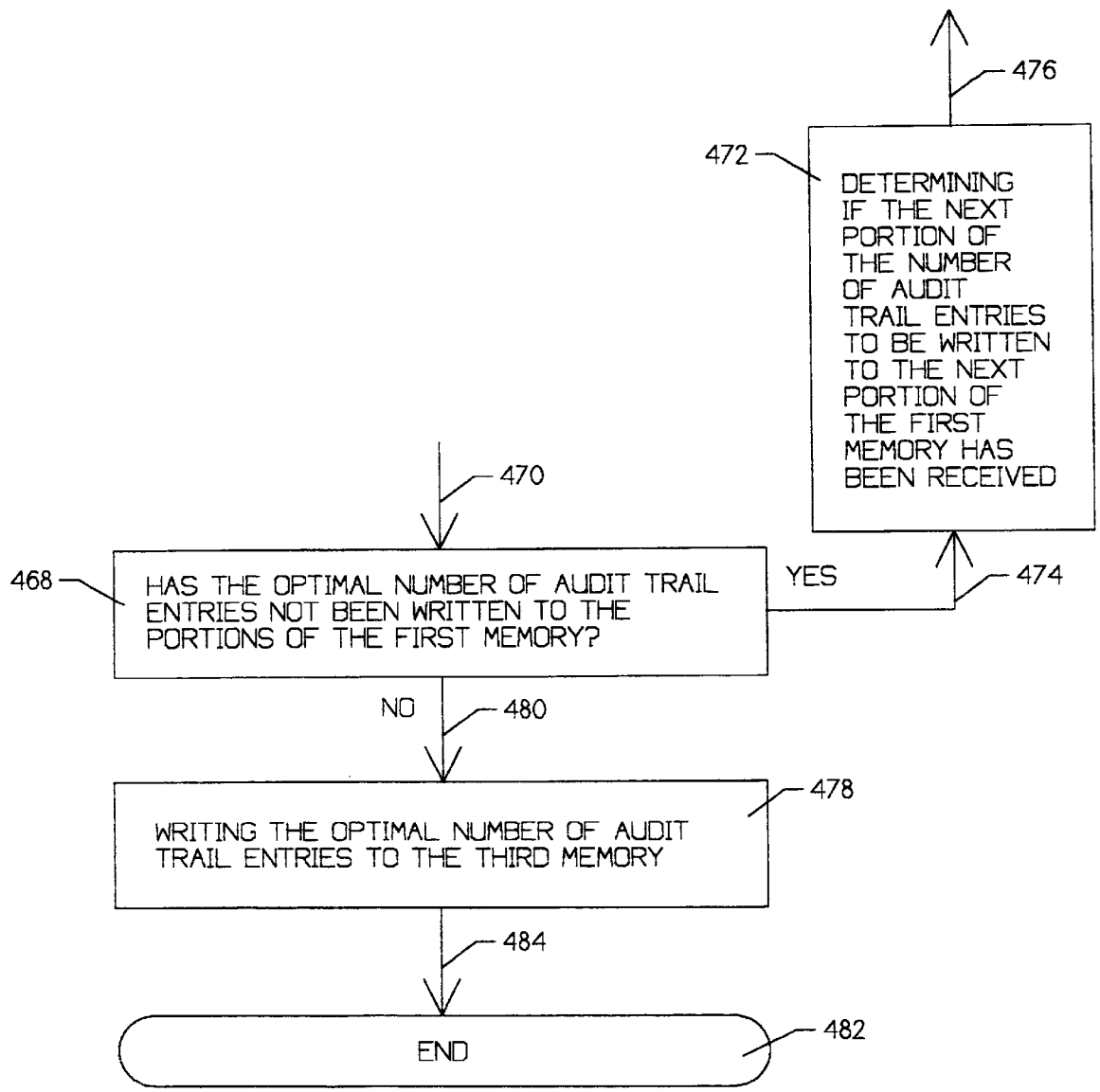

FIGS. 12A, 12B and 12C are a second flow diagram showing another exemplary method of the present invention. The diagram is shown generally at 420. The flow diagram is entered at element 422, wherein control is passed to element 424 via interface 426. Element 424 receives a portion of the number of audit trail entries. Control is then passed to element 428 via interface 430. Element 428 writes the portion of the number of audit trail entries into a portion of the first memory. Control is then passed to element 432 via interface 434. Element 432 determines if the next portion of the number of audit trail entries has been received. Control is then passed to element 436 via interface 438. Element 436 determines if a request to write the portion of the first memory into a corresponding portion of the second memory has been received. Control is then passed to element 440 via interface 442. If the condition of the next portion of the number of audit trail entries being received and the request to write the portion of the first memory to the corresponding portion of the second memory not being received is satisfied, control is passed to element 444 via interface 446. Element 444 writes the next portion of the number of audit trail entries into the portion of the first memory. Control is then passed back to element 432 via interface 446. If the condition of the next portion of the number of audit trail entries being received and the request to write the portion of the first memory to the corresponding portion of the second memory not being received is not satisfied, control is passed to element 448 via interface 450. If the condition of the request to write the portion of the first memory to the corresponding portion of the second memory not being received is satisfied, control is passed back up to element 432 via interface 446. If the condition of the request to write the portion of the first memory to the corresponding portion of the second memory not being received is not satisfied, control is then passed to element 452 via interface 454. Element 452 writes the portion of the first memory into the corresponding portion of the second memory. Control is then passed to element 456 via interface 458. Element 456 determines if an optimal number of audit trail entries has been written to the portions of the first memory. Control is then passed to element 460 via interface 462. If the condition of the next portion of the number of audit trail entries being received and the optimal number of audit trail entries not being written to the portions of the first memory is satisfied, control is passed to element 464 via interface 466. Element 464 writes the next portion of the number of audit trail entries into a next portion of the first memory. Control is then passed back up to element 432 via interface 446. If the condition of the next portion of the number of audit trail entries being received and the optimal number of audit trail entries not being written to the portions of the first memory is not satisfied, control is then passed to element 468 via interface 470. If the condition of the optimal number of audit trail entries not being written to the portions of the first memory is satisfied, control is then passed to element 472 via interface 474. Element 472 determines if the next portion of the number of audit trail entries to be written to the next portion of the first memory has been received. Control is then passed back up to element 436 via interface 476. If the condition of the optimal number of audit trail entries not being written to the portions of the first memory is not satisfied, control is then passed to element 478 via interface 480. Element 478 writes the optimal number of audit trail entries to the third memory. Control is then passed to element 482 via interface 484, where the algorithm is exited.

Having thus described the preferred embodiments of the present invention, those of skill in the art will readily appreciate that the teachings found herein may be applied to yet other embodiments within the scope of the claims hereto attached.

What is claimed is:

1. An apparatus for providing backup memory storage for audit trail data within a computer system, the computer system executing a number of transaction programs which are generating a number of audit trail entries, comprising:

a. a first memory;

b. a second memory;

c. a third memory; and d. control means coupled to said first memory, said second memory, and said third memory to store a portion of the number of the audit trail entries to a one of a number of portions of said first memory, the audit trail entries being accumulated within said one of said number of portions of said first memory until an indication is received by said control means that indicates said one of said number of portions of said first memory is not to receive any additional audit trail entries, subsequent ones of the number of audit trail entries being stored within a next one of said number of portions of said first memory wherein said indication comprises a synchronous audit data request wherein said synchronous audit data request comprises a one of the number of audit trail entries having a commit in progress status.

2. An apparatus according to claim 1 wherein the control means further comprises writing the one of the number of portions of the first memory to a corresponding one of a number of portions of the second memory once the indication is received, each subsequent indication received by the control means resulting in the subsequent one of the number of portions of the first memory being written to said corresponding subsequent one of said number of portions of the second memory.

3. An apparatus according to claim 2 wherein the control means further comprises writing the number of portions of the first memory to a corresponding number of portions of the third memory once the control means determines that enough of the number of audit trail entries have been accumulated within the number of portions of the first memory.

4. An apparatus according to claim 3 wherein the control means determines that enough of the number of audit trail entries have been accumulated within the number of portions of the first memory when the number of portions of the first memory to be written to the corresponding number of portions of the third memory results in an optimal transfer efficiency.

5. An apparatus according to claim 4 wherein the optimal transfer efficiency corresponds to a predetermined size of the number of portions of the first memory.

6. An apparatus according to claim 4 wherein the optimal transfer efficiency corresponds to a predetermined number of the audit trail entries having been accumulated within the number of portions of the first memory.

7. An apparatus according to claim 4 wherein the control means is an executive program.

8. An apparatus according to claim 4 wherein the first memory is a main memory storage and the second memory is a non-volatile memory.

9. An apparatus according to claim 8 wherein the non-volatile memory is a cache memory.

10. An apparatus according to claim 4 wherein the first memory is a non-volatile memory and the second memory is a main memory storage.

11. An apparatus according to claim 10 wherein the non-volatile memory is a cache memory.

12. An apparatus according to claim 4 wherein the first memory is a non-volatile memory and the second memory is a non-volatile memory.

13. An apparatus according to claim 12 wherein the second memory is a cache memory.

14. An apparatus according to claim 4 wherein the third memory is a magnetic tape storage medium.

15. An apparatus according to claim 4 wherein the third memory is a disk storage device.

16. An apparatus according to claim 4 wherein the third memory is part of a remote data processing system.

17. An apparatus according to claim 16 wherein the remote data processing system is contained within a unique power domain.

18. An apparatus according to claim 4 wherein the third memory is another number of portions of the first memory.

19. An apparatus according to claim 2 wherein the control means further comprises writing the number of portions of the second memory to a corresponding number of portions of the third memory once the control means determines that enough of the number of audit trail entries have been accumulated within the number of portions of the first memory.

20. An apparatus according to claim 19 wherein the control means determines that enough of the number of audit trail entries have been accumulated within the number of portions of the first memory when the number of portions of the first memory to be written to the corresponding number of portions of the third memory results in an optimal transfer efficiency.

21. An apparatus according to claim 20 wherein the optimal transfer efficiency corresponds to a predetermined size of the number of portions of the first memory.

22. An apparatus according to claim 20 wherein the optimal transfer efficiency corresponds to a predetermined number of the audit trail entries having been accumulated within the number of portions of the first memory.

23. An apparatus according to claim 20 wherein the control means is an executive program.

24. An apparatus according to claim 20 wherein the first memory is a main memory storage and the second memory is a non-volatile memory.

25. An apparatus according to claim 24 wherein the non-volatile memory is a cache memory.

26. An apparatus according to claim 20 wherein the first memory is a non-volatile memory and the second memory is a main memory storage.

27. An apparatus according to claim 26 wherein the non-volatile memory is a cache memory.

28. An apparatus according to claim 20 wherein the first memory is a non-volatile memory and the second memory is a non-volatile memory.

29. An apparatus according to claim 28 wherein the second memory is a cache memory.

30. An apparatus according to claim 20 wherein the third memory is a magnetic tape storage medium.

31. An apparatus according to claim 20 wherein the third memory is a disk storage device.

32. An apparatus according to claim 20 wherein the third memory is part of a remote data processing system.

33. An apparatus according to claim 32 wherein the remote data processing system is contained within a unique power domain.

34. An apparatus according to claim 20 wherein the third memory is another number of portions of the first memory.

35. An apparatus for providing backup memory storage for audit trail data within a computer system having a backup memory storage, the computer system executing a number of transaction programs which are generating a number of audit trail entries, comprising:

a. a non-volatile storage means wherein said non-volatile storage means is a cache memory; and b. control means coupled to said non-volatile storage means and the backup memory storage to store a portion of the number of the audit trail entries into a one of a number of portions of said non-volatile storage means, the audit trail entries being accumulated within said one of said number of portions of said non-volatile storage means until an indication is received by said control means that indicates said one of said number of portions of said non-volatile storage means is not to receive any additional audit trail entries, subsequent ones of the number of audit trail entries being stored within a next one of said number of portions of said non-volatile storage means.

36. An apparatus according to claim 35 wherein the control means further comprises writing the number of portions of the non-volatile storage means to a corresponding number of portions of the backup memory storage once the indication is received and the control means determines that enough of the number of audit trail entries have been accumulated within the number of portions of the non-volatile storage means.

37. An apparatus according to claim 36 wherein the indication comprises a synchronous audit data request.

38. An apparatus according to claim 37 wherein the synchronous audit data request comprises a one of the number of audit trail entries having a commit in progress status.

39. An apparatus according to claim 36 wherein the control means determines that enough of the number of audit trail entries have been accumulated within the number of portions of the non-volatile storage means when the number of portions of the non-volatile storage means to be written to the corresponding number of portions of the backup memory storage results in an optimal transfer efficiency.

40. An apparatus according to claim 39 wherein the optimal transfer efficiency corresponds to a predetermined size of the number of portions of the non-volatile storage means.

41. An apparatus according to claim 39 wherein the optimal transfer efficiency corresponds to a predetermined number of the audit trail entries having been accumulated within the number of portions of the non-volatile storage means.

42. A method for providing backup memory storage for audit trail data within a computer system having a first memory, a second memory, and a third memory, wherein said first memory is a non-volatile memory and said second memory is a main memory storage and wherein said non-volatile memory is a cache memory, the computer system executing a number of transaction programs which are generating a number of audit trail entries, the method comprising the steps of:

a. receiving a portion of the number of audit trail entries;

b. writing said portion of the number of audit trail entries into a portion of the first memory;

c. determining if said next portion of the number of audit trail entries has been received;

d. determining if a request to write said portion of the first memory to a corresponding portion of the second memory has been received;

e. going to step (b) to store said next portion of the number of audit trail entries into said portion of the first memory if said next portion of the number of audit trail entries has been received and said request to write said portion of the first memory to said corresponding portion of the second memory has not been received;

f. going to step (c) if said request to write said portion of the first memory to said corresponding portion of the second memory has not been received;

g. writing said portion of the first memory to said corresponding portion of the second memory;

h. determining if an optimal number of audit trail entries has been written to said portions of the first memory;

i. going to step (b) to write said next portion of the number of audit trail entries into a next portion of the first memory if said next portion of the number of audit trail entries has been received and said optimal number of audit trail entries has not been written to said portions of the first memory;

j. going to step ĉ if said optimal number of audit trail entries has not been written to said portions of the first memory to determine if said next portion of the number of audit trail entries to be written into said next portion of the first memory has been received; and k. writing said optimal number of audit trail entries to the third memory.

43. A method according to claim 42 wherein the step of writing the optimal number of audit trail entries to the third memory comprises writing the portions of the first memory to the corresponding portions of the third memory.

44. A method according to claim 42 wherein the step of writing the optimal number of audit trail entries to the third memory comprises writing the portions of the second memory to the corresponding portions of the third memory.

45. A method according to claim 42 wherein the portion of the number of audit trail entries is one of the number of audit trail entries.

46. A method according to claim 42 wherein the request comprises a synchronous audit data request.

47. A method according to claim 46 wherein the synchronous audit data request comprises a one of the number of audit trail entries having a commit in progress status.

48. A method according to claim 42 wherein the optimal number of audit trail entries written to the portions of the first memory corresponds to a predetermined size of the portions of the first memory.

49. A method according to claim 42 wherein each one of the number of audit trail entries contains audit data for one database transaction.

50. A method according to claim 42 wherein the first memory is a main memory storage and the second memory is a non-volatile memory.

51. A method according to claim 50 wherein the non-volatile memory is a cache memory.

52. A method according to claim 42 wherein the third memory is a magnetic tape storage medium.

53. A method according to claim 42 wherein the third memory is a disk storage device.

54. A method according to claim 42 wherein the third memory is a portion of the main memory storage.

55. A method for providing backup memory storage for audit trail data within a computer system having a volatile main memory storage and a backup memory storage, the computer system executing a number of transaction programs which are generating a number of audit trail entries, the method comprising the steps of:

a. providing a non-volatile memory;

b. writing a portion of the number of audit trail entries into a one of a number of portions of the main memory storage, said portion of the number of audit trail entries being accumulated within said one of said number of portions of the main memory storage until one of a number of indications is received indicating that said one of said number of portions of the main memory storage is not to receive any additional ones of the number of audit trail entries, subsequent portions of the number of audit trail entries being accumulated within subsequent ones of said number of portions of the main memory storage when subsequent ones of said number of indications are received;

c. writing said one of said number of portions of the main memory storage to a corresponding one of a number of portions of the non-volatile memory once said one of said number of indications is received, subsequent said ones of said number of indications received resulting in subsequent said ones of said number of portions of the main memory storage being written to said corresponding subsequent ones of said number of portions of the non-volatile memory; and d. writing an optimal number of audit trail entries to a corresponding number of portions of the backup memory storage, said optimal number of audit trail entries being the portions of the number of audit trail entries accumulated within said number of portions of the main memory storage.

56. A method according to claim 55 wherein the step of writing the optimal number of audit trail entries to the corresponding number of portions of the backup memory storage comprises writing the number of portions of the main memory storage to the corresponding number of portions of the backup memory storage once the optimal number of audit trail entries has been accumulated within the number of portions of the main memory storage.

57. A method according to claim 55 wherein the step of writing the optimal number of audit trail entries to the corresponding number of portions of the backup memory storage comprises writing the number of portions of the non-volatile memory to the corresponding number of portions of the backup memory storage once the optimal number of audit trail entries has been accumulated within the number of portions of the main memory storage.

58. A method according to claim 55 wherein the one of the number of indications comprises a synchronous audit data request.

59. A method according to claim 58 wherein the synchronous audit data request comprises a one of the number of audit trail entries having a commit in progress status.

60. A method for providing backup memory storage for audit trail data within a computer system having a first memory and a second memory, the computer system executing a number of transaction programs which are generating a number of audit trail entries, the method comprising the steps of:

a. receiving a portion of the number of audit trail entries;

b. writing said portion of the number of audit trail entries into a portion of the first memory;

c. determining if said portion of the number of audit trail entries has a commit in progress status;

d. determining if said next portion of the number of audit trail entries has been received;

e. going to step (b) to store said next portion of the number of audit trail entries into said portion of the first memory if said next portion of the number of audit trail entries has been received and said portion of the number of audit trail entries does not have a commit in progress status;

f. going to step (c) if said portion of the number of audit trail entries does not have a commit in progress status;

g. determining if an optimal number of audit trail entries has been written to said portions of the first memory;

h. going to step (b) to write said next portion of the number of audit trail entries into a next portion of the first memory if said next portion of the number of audit trail entries has been received and said optimal number of audit trail entries has not been written to said portions of the first memory;

i. going to step (b) if said optimal number of audit trail entries has not been written to said portions of the first memory to determine if said next portion of the number of audit trail entries to be written to said next portion of the first memory has been received; and j. writing the portions of the first memory to the corresponding portions of the second memory.

* * * * *